United States Patent [19]
Weaver et al.

[11] Patent Number: 5,376,650
[45] Date of Patent: Dec. 27, 1994

[54] LIGHT ABSORBING POLYMERS

[75] Inventors: Max A. Weaver; James J. Krutak; Clarence A. Coates; Wayne P. Pruett, all of Kingsport; Samuel D. Hilbert, Jonesborough, all of Tenn.

[73] Assignee: Eastman Chemical Company, Kingsport, Tenn.

[21] Appl. No.: 206,108

[22] Filed: Mar. 3, 1994

Related U.S. Application Data

[63] Continuation of Ser. No. 11,044, Jan. 29, 1993, abandoned, which is a continuation of Ser. No. 712,384, Jun. 10, 1991, abandoned.

[51] Int. Cl.$^5$ .............. C08G 10/00; C08L 61/00; C08L 65/00
[52] U.S. Cl. .............. 525/154; 525/157; 525/163; 525/164; 525/472; 525/473; 525/519; 525/465; 525/427; 525/428; 525/441; 525/443; 525/456; 528/230; 528/246; 528/248; 528/249; 528/251; 528/252
[58] Field of Search ........... 525/154, 472, 473, 519, 525/465, 427, 428, 441, 443, 456; 528/129, 154, 163, 230, 246, 248, 249, 251, 252

[56] References Cited

U.S. PATENT DOCUMENTS

| | | | |
|---|---|---|---|
| 3,546,270 | 12/1970 | Kirchmayr et al. | 8/115.6 |
| 3,553,245 | 1/1971 | Weaver et al. | 8/922 |
| 3,631,049 | 12/1971 | Straley et al. | 546/165 |
| 3,879,434 | 4/1975 | Weaver | 546/165 |
| 3,927,063 | 12/1975 | Peter et al. | 8/532 |
| 4,116,923 | 9/1978 | Gattner et al. | 528/220 |
| 4,331,584 | 5/1982 | Nishikuri | 524/206 |
| 4,397,651 | 8/1983 | Hans-Juergen Degen et al. | 8/919 |
| 4,423,203 | 12/1983 | Corvan et al. | 528/266 |
| 4,540,770 | 9/1985 | Chevallier | 528/248 |
| 4,617,373 | 10/1986 | Pruett et al. | 528/288 |
| 4,617,374 | 10/1986 | Pruett et al. | 528/288 |
| 4,640,690 | 2/1987 | Baumgartner | 8/506 |
| 4,707,537 | 11/1987 | Pruett et al. | 528/288 |
| 4,778,742 | 10/1988 | Ong et al. | 430/106 |
| 4,826,903 | 5/1989 | Weaver et al. | 524/205 |
| 4,900,127 | 2/1990 | Robello et al. | 528/373 |
| 4,958,043 | 9/1990 | Weaver et al. | 558/403 |
| 4,994,512 | 2/1991 | Weaver et al. | 524/209 |
| 5,057,594 | 10/1991 | Krutak et al. | 528/272 |
| 5,102,973 | 4/1992 | Iimura et al. | 528/176 |
| 5,212,269 | 5/1993 | Fischer et al. | 526/266 |
| 5,247,055 | 9/1993 | Stenger-Smith et al. | 528/310 |
| 5,254,625 | 10/1993 | Weaver et al. | 525/165 |
| 5,274,058 | 12/1993 | Ferraris et al. | 526/256 |
| 5,274,072 | 12/1993 | Weaver et al. | 528/354 |

FOREIGN PATENT DOCUMENTS

| | | |
|---|---|---|
| 1088637 | 9/1960 | Germany . |
| 423773 | 3/1967 | Switzerland . |
| 1048348 | 11/1966 | United Kingdom . |
| 1130265 | 10/1968 | United Kingdom . |
| 1316288 | 5/1973 | United Kingdom . |

*Primary Examiner*—John Kight, III
*Assistant Examiner*—Jeffrey Culpeper Mullis
*Attorney, Agent, or Firm*—Bernard J. Graves, Jr.

[57] ABSTRACT

Provided are light-absorbing polymers which contain backbone unsaturations and which are produced by knoevenagel condensation and which are useful for imparting color and/or ultraviolet light screening properties to thermoplastic resins. The polymeric colorants or UV absorbers may be added during the formation of the uncolored thermoplastic polymer or melt or solution blended with other thermoplastic polymers.

18 Claims, No Drawings

LIGHT ABSORBING POLYMERS

This is a continuation of copending application Ser. No. 08/011,044 filed on Jan. 29, 1993 abandoned which is a continuation of Ser. No. 07/712,384 filed on Jun. 10, 1991 abandoned.

FIELD OF THE INVENTION

This invention belongs to the field of polymer chemistry. More particularly, this invention relates to light-absorbing polymers containing methine linkages and thermoplastic polymers to which said light absorbing polymers have been added.

BACKGROUND OF THE INVENTION

It is well known, of course, that one may impart color to thermoplastic polymeric compositions by using pigments and soluble dyes. See, for example, *Coloring of Plastics*, T. G. Weber, ed., John Wiley & Sons, New York, 1979. Plastics colored with pigments are usually opaque and may lack brilliance of color afforded by soluble dyes. Use of pigments also is accompanied by problems in storage, blending, uniformity, etc. Some of the deficiencies encountered in the use of pigments can be overcome by use of soluble dyes which give improved clarity and brilliance, but this approach often results in migration and problems related to solvent extraction of the dye from the thermoplastic resins. Some improvement in solvent extraction and migration properties has been achieved by incorporating poly(oxyalkylene) polymer units into colorants. (See U.S. Pat. No. 4,640,690.) These colorants have the disadvantage, however, of having a significant portion of their weight consisting of non-colored polymeric composition. U.S. Pat. No. 4,116,923 teaches the incorporation of reactive colorants into cross-linked polyester resins and the use of these colored polyester resins to color thermoplastics such as polyolefins. Here again, a major portion of the colored polyester resin used to color the polyolefins is "non-colored" resulting in lower tinctorial strength. Finally, it is known that one may improve the nonextractability of colorants and UV absorbers in thermoplastic polyesters by copolymerizing thermally stable colorants into the backbone of the polyester composition. (See U.S. Pat. Nos. 4,617,373; 4,617,374; and 4,707,537.) This method suffers from the difficulty in finding non-volatile, very reactive colorants which will not be lost by volatilization or decomposition during the stages of ester interchange and polycondensation of the polyester preparation.

West German Patent No. 1,088,637 describes high molecular weight pigment dyes which are derived from aromatic dialdehydes and bifunctional active methylene compounds. These compounds are described as useful as colored pigments in the fields of plastics, paints and printing inks. The polymeric colorants of the present invention, as described below, can be utilized as soluble colorants for thermoplastic resins and have increased light absorbing capability relative the high molecular weight pigment dyes.

It is known that one may color thermoplastic polymeric materials using color concentrates consisting of physical admixtures of polymers and colorants. However, the use of such physical admixtures to color polymeric materials such as polyesters, e.g., poly(ethylene terephthalate) and blends thereof, presents a number of problems:

1. Colorant migration during drying of the colored polymer pellets.
2. Colorant migration during extrusion and colorant accumulation on dies which can cause film rupture and shut-downs for clean-up, etc. Such colorant migration and accumulation result in time consuming and difficult clean-up when a polymer of another color is subsequently processed in the same equipment.
3. Colorants may not mix well, for example, when using two or more color concentrates to obtain a particular shade.
4. Colorants may diffuse or exude during storage of the colored polymeric material.

SUMMARY OF THE INVENTION

This invention relates to polymeric light absorbing compounds which contain methine linkages. The compounds are thermally stable and are useful in imparting UV and/or visible light absorbing properties to a variety of polymeric substrates, particularly thermoplastic polymers. Their low volatility allows them to be added during high temperature polymerizations such as encountered in preparation of polyesters or to be melt blended with the polymeric substrate. The polymeric compounds are less volatile and less extractable from the thermoplastic polymers than are typical monomeric colorants and UV absorbers.

This invention relates to polymeric light absorbing compounds represented by Formula (I)

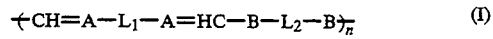

$$\{CH=A-L_1-A=HC-B-L_2-B\}_n \qquad (I)$$

and thermoplastic resin compositions to which (I) has been added to impart UV and/or visible light absorbing properties; wherein A is the residue of an organic active methylene group and B is a divalent organic moiety which contains at least one carbocyclic or heterocyclic aromatic ring which is attached to a methylidene moiety; wherein $L_1$ is an organic divalent linking group; wherein $L_2$ is an organic divalent linking group or a covalent bond; and wherein n is an integer of at least 2.

Compounds of Formula (I) are useful in imparting light absorbing properties to polymeric substrates, particularly thermoplastic polymers. Their excellent thermal stability allows them to be added during preparation of the polymer or to be melt blended with the polymeric substrates. The polymeric compounds are less volatile and less extractable from the thermoplastic polymers than are the typical monomeric colorants, thus rendering the polymeric compositions useful for imparting color and/or UV absorbing properties to packaging materials, coatings, cosmetics, and home care products where nonexposure to humans is desirable.

DETAILED DESCRIPTION OF THE INVENTION

Plastics, paints, printing inks, rubber, cosmetics, e.g., lipsticks, etc., are usually colored by organic colorants when superior brilliance and tinctorial strength are advantageous. Toxicity has been a chronic problem related to the use of these materials as some have been shown to be potential carcinogens and to cause contact dermatitis, for example. Recent publications document the continued concern. (See, for example, Federal Register, Jul. 15, 1988 and *ACTA Derm. Venerol.*, Suppl., 1987, 134, pp. 95–97.) Plastics usually consist of large macromolecules and other ingredients such as fillers, plasticizers, colorants, etc. Most polymers do not produce allergic reactions by themselves, but leachable additives are known to cause contact dermatitis. (S. Fregert, *Manual of Contact Dermatitis*, Munkgard, Denmark, 2nd Ed. 1981.)

The overall purpose of this invention is to provide colorants and UV absorbers which can be incorporated into thermoplastic polymeric compositions wherein the light absorbing compounds are thermally stable, have low extractability, volatility, sublimation, and which do not exude from the polymeric substrate. These polymeric compositions containing the light absorbing properties are useful as packaging materials, films, fibers, etc., since exposure to toxic molecules readily absorbed by the body is greatly minimized. Of course, when visible light is absorbed the polymeric compositions are colored. The presence of UV light absorbing compounds in polymeric compositions provides protection from harmful UV light rays for products packaged or contained therein.

The present invention provides a polymer represented by Formula (I)

$$\text{-(CH=A-L}_1\text{-A=HC-B-L}_2\text{-B)}_{\overline{n}} \qquad (I)$$

wherein A is selected from the formulae:

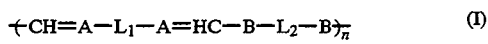

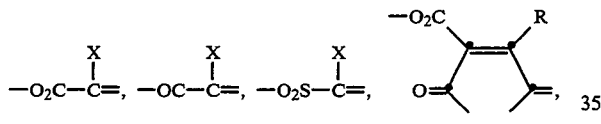

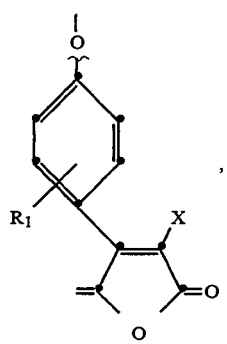

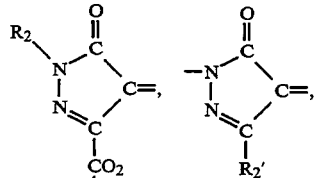

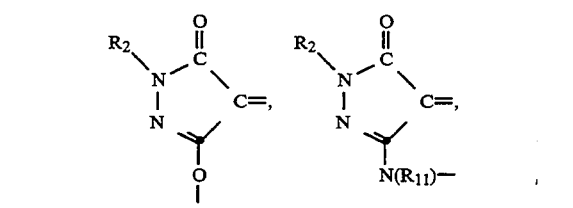

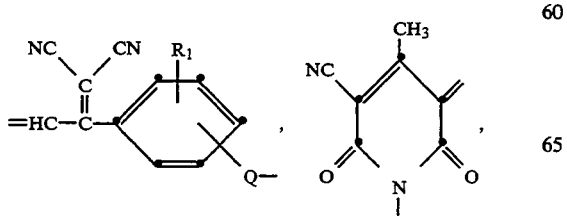

-continued

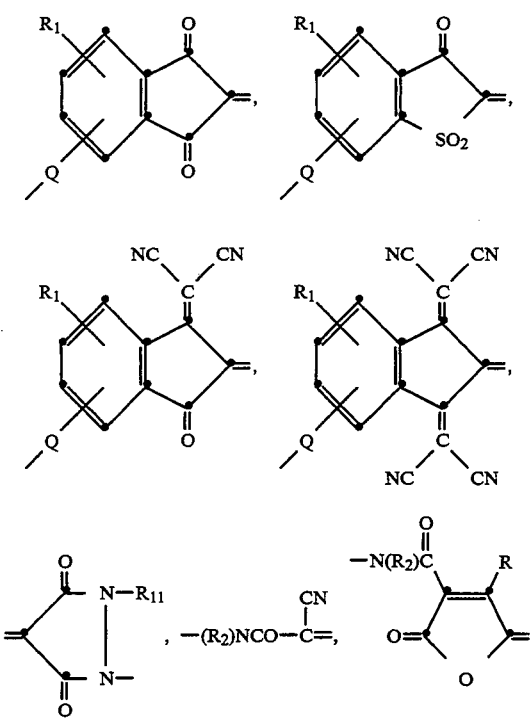

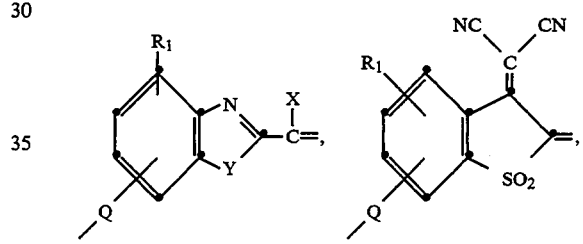

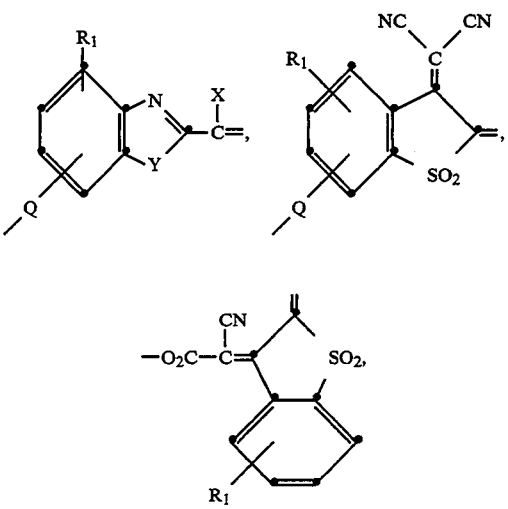

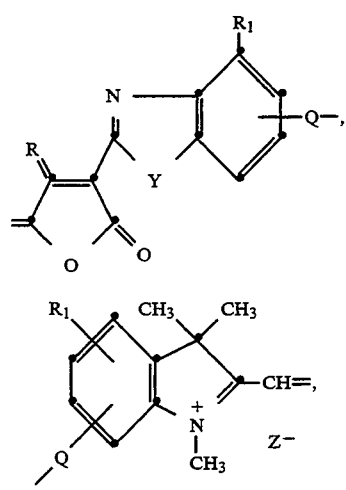

-continued

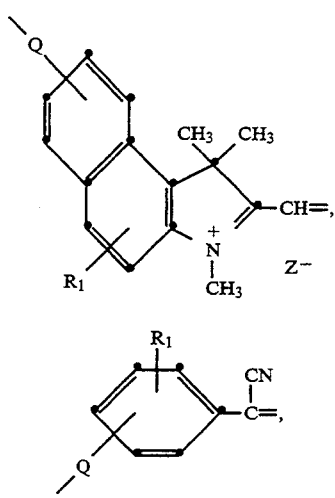

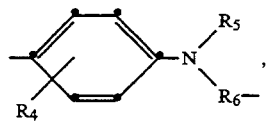

wherein
- Q is selected from a covalent bond, —CO₂, —CO—, —S—, —O—, —CON(R₂)—, —N(SO₂R₃)—, SO₂ or —SO₂N(R₂)—;
- X is selected from cyano; unsubstituted and substituted carboxylic acid ester; unsubstituted and substituted carbamoyl; unsubstituted or substituted alkylsulfonyl; C₃-C₈ cycloalkylsulfonyl; or arylsulfonyl or unsubstituted or substituted carbocylic or heterocyclic aryl;
- Y is selected from —O—, —S—, —NH— or substituted imino;
- Z⁻ is a counter anion; R is hydrogen, lower alkyl, or unsubstituted or substituted carbocyclic or heterocyclic aryl;
- R₁ is selected from hydrogen or 1-2 groups selected from lower alkyl, lower alkoxy or halogen;
- R₂ is selected from hydrogen, unsubstituted or substituted lower alkyl, C₃-C₈ cycloalkyl or unsubstituted or substituted carbocyclic or heterocyclic aryl;
- R₂' is selected from —OR₃, —NHR₃, or one of the groups listed for R₂;
- R₃ is unsubstituted or substituted alkyl; C₃-C₈ cycloalkyl or unsubstituted or substituted carbocyclic or heterocyclic aryl;
- or wherein =A—L₁—A= in combination has the structure =C(CN)-arylene-C(CN)=;
- and wherein the divalent moiety B is represented by one of the following formulae:

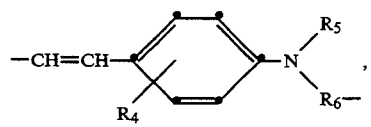

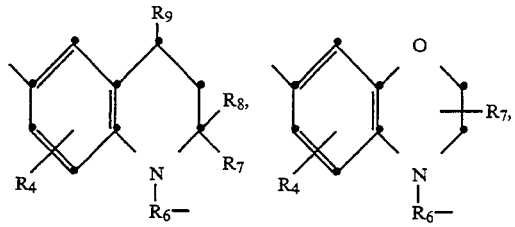

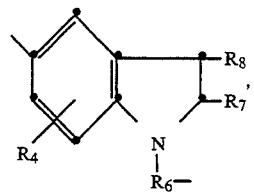

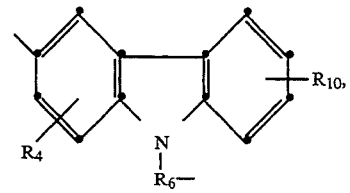

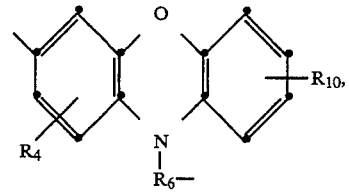

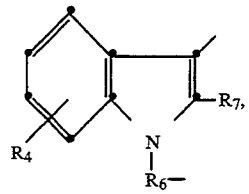

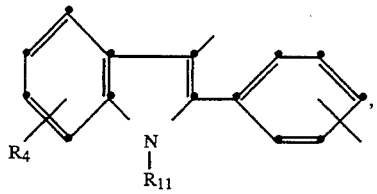

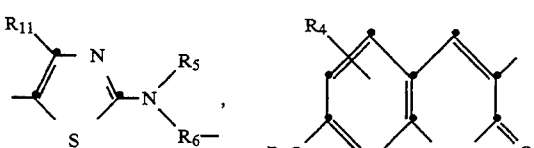

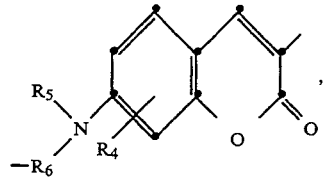

-continued

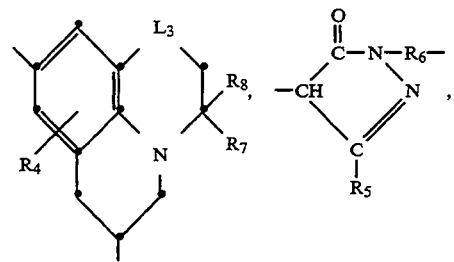

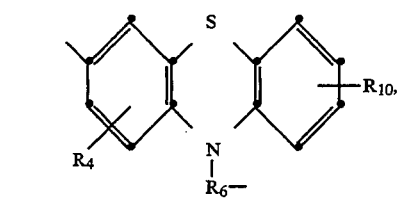

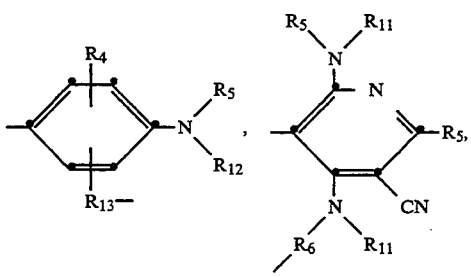

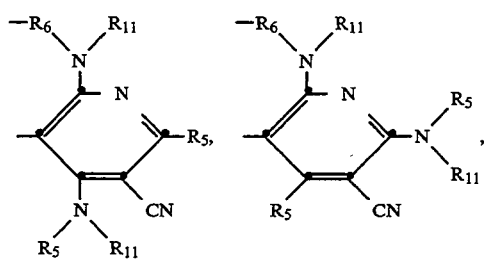

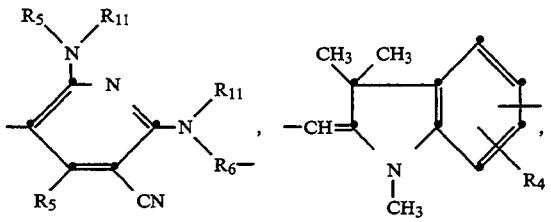

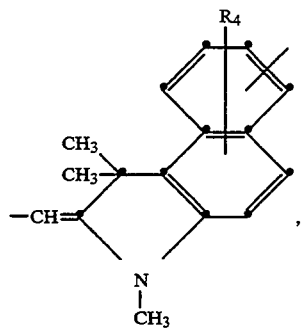

-continued

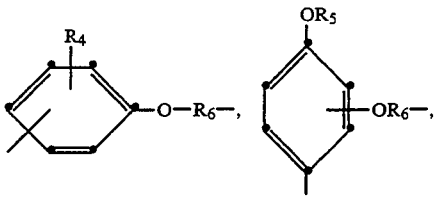

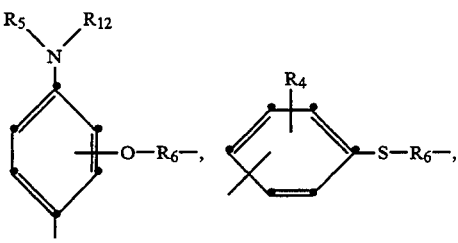

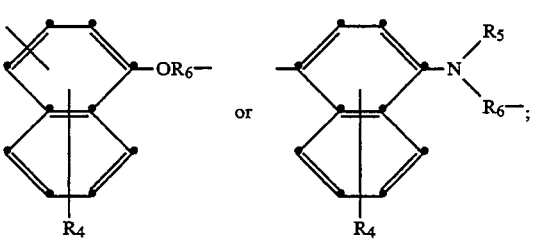

wherein $R_4$ and $R_{10}$ are hydrogen or 1–2 substituents selected from lower alkyl, lower alkoxy or halogen;

$R_5$ and $R_{12}$ are selected from unsubstituted lower alkyl, lower alkenyl, lower alkynyl, $C_3$–$C_8$ cycloalkyl, or phenyl and substituted lower alkyl, $C_3$–$C_8$ cycloalkyl and phenyl;

$R_6$ is selected from unsubstituted or substituted lower alkylene, $C_3$–$C_8$ cycloalkylene, arylene, alkylene-arylene-alkylene, alkylene-($C_3$–$C_8$)cycloalkylene-alkylene, alkylene-O-alkylene, alkylene-S-alkylene, alkylene-SO$_2$-alkylene, alkylene-O-arylene-O-alkylene, alkylene-N(SO$_2$R$_3$)alkylene or alkylene-arylene;

$R_7$, $R_8$, $R_9$ are hydrogen or alkyl;

$R_{11}$ is hydrogen, lower alkyl or aryl;

$R_{13}$ is selected from lower alkylene, —O—R$_6$— or —N(SO$_2$R$_3$)—R$_6$—;

$L_1$ is selected from the same divalent groups as listed above for $R_6$;

$L_2$ is selected from a covalent bond; unsubstituted or substituted phenylene; $C_3$–$C_8$ cycloalkylene; —O—; —S—; —SO$_2$—; —CO—; —CO$_2$—; —OCO$_2$—; —O$_2$C-alkylene-CO$_2$—; —O$_2$C-arylene-CO$_2$—; —O$_2$C—($C_3$–$C_8$)cycloalkylene-CO$_2$—; —O$_2$CNH-alkylene-NHCO$_2$—; —O$_2$CNH-arylene-NHCO$_2$—; —CO$_2$-alkylene-O$_2$C—; —SO$_2$N(R$_2$)—; —N(R$_3$)—; —SO$_2$-alkylene-SO$_2$—; —SO$_2$-arylene-SO$_2$—; —SO$_2$N(R$_2$)-alkylene-N(R$_2$)SO$_2$—; —SO$_2$N(R$_2$)-arylene-N(R$_2$)SO$_2$—; —O-alkylene-O— or —O-arylene-O—;

$L_3$ is selected from covalent bond, —O—, —CH$_2$— or —CH(CH$_3$)—;

and n is an integer of from 2 to about 50; or —B—L$_2$—B— in combination represents the formula:

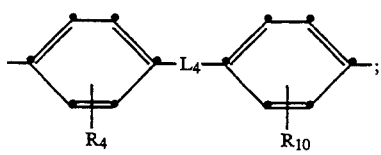

wherein
L$_4$ is selected from —N(R$_5$)—, —O—, —S—, —CH=CH— or

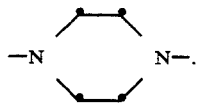

Of course, as will be understood by those skilled in the art, the polymers of Formula (I) are terminated with an aldehyde or active methylene group present on the starting monomer.

In a preferred embodiment of the present invention, are the compounds of Formula (I) above wherein the active methylene moiety A has the structure —O$_2$C—C(CN)= or wherein —A—L$_1$—A— in combination has the structure =C(CN)—C$_6$H$_4$—p—C—(CN)=; wherein B is selected from the following formula:

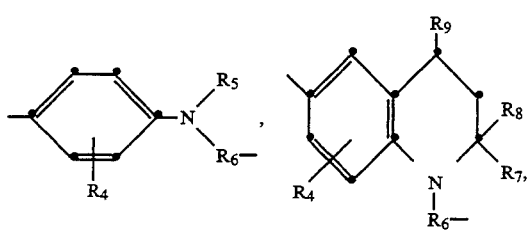

or wherein —B—L$_2$—B— has the following formula:

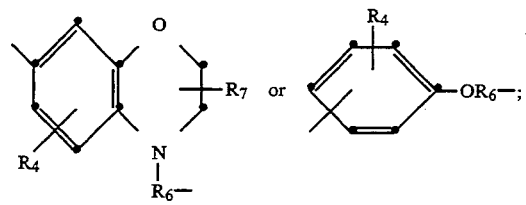

wherein
R$_4$, R$_7$, R$_8$, and R$_9$ are as defined above;
R$_4'$ is selected from the groups listed for R$_4$;
R$_5$ is selected from the following groups: lower alkenyl; cycloalkyl; cycloalkyl substituted with one or two of lower alkyl, lower alkoxy or halogen; phenyl and phenyl substituted with one or two of lower alkyl, lower alkoxy, alkoxycarbonyl, halogen, alkanoylamino, cyano, nitro or alkylsulfonyl; straight or branched chain alkyl of 1–8 carbons and such alkyl substituted with one or more of the following: C$_3$–C$_8$ cycloalkyl and C$_3$–C$_8$ cycloalkyl substituted with one or two of lower alkyl, lower alkoxy, or halogen; phenyl and phenyl substituted with one or more of lower alkyl, lower alkoxy, alkoxycarbonyl, halogen, alkanoylamino, cyano, nitro or alkylsulfonyl; cyano; halogen; 2-pyrrolidino; phthalimidino, vinylsulfonyl; acrylamido; o-benzoic sulfimido; alkoxy; alkoxy alkoxy; cyanoalkoxy; phenoxy; phenoxy substituted with lower alkyl, lower alkoxy, or halogen; groups of the formula:

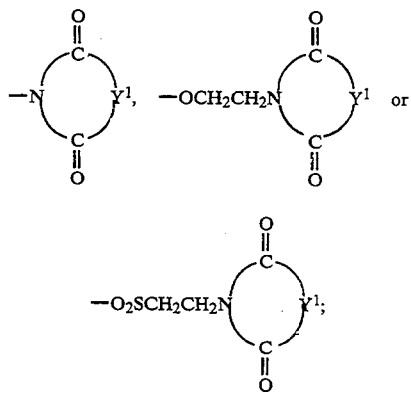

wherein
Y$^1$ is selected from o-phenylene; o-phenylene substituted with lower alkyl, lower alkoxy, halogen or nitro; —O—CH$_2$—; —OCH$_2$CH$_2$—; —CH$_2$OCH$_2$—; —S—CH$_2$; —CH$_2$SCH$_2$—; —NHCH$_2$—; —NHCH$_2$CH$_2$—; —N(alkyl)CH$_2$—; —N(alkyl)CH$_2$CH$_2$— or —NHC(C$_6$H$_5$)$_2$—; groups of the formula:

—S—R$_{14}$, —OCH$_2$CH$_2$SR$_{14}$, —SO$_2$CH$_2$CH$_2$SR$_{14}$,

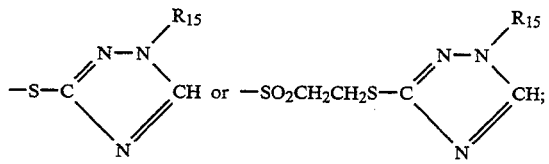

wherein
R$_{14}$ is selected from lower alkyl; cycloalkyl; phenyl; phenyl substituted with one or more groups selected from lower alkyl, lower alkoxy or halogen; pyridyl; pyrimidinyl; benzoxazolyl; benzothiazolyl; benzimidazolyl; 1,3,4-thiadiazolyl, 1,3,4-oxadiazolyl; these heterocyclic radicals substituted with one or more groups selected from lower alkyl, lower alkoxy or halogen;
R$_{15}$ is selected from hydrogen, lower alkyl or benzyl; wherein the alkyl groups represented by R$_5$ may be further substituted by groups of the formulae:

—SO$_2$R$_{16}$;

—SO$_2$N(R$_{17}$)R$_{18}$;

—CON(R$_{17}$)R$_{18}$;

R(R$_{17}$)COR$_{18}$ wherein
R$_{16}$ is selected from cycloalkyl; cycloalkyl substituted with alkyl; allyl; phenyl; phenyl substituted with one or two groups selected from lower alkyl, lower alkoxy or halogen; lower alkyl; lower alkyl substituted with one or more groups selected from lower alkoxy, halogen, cyano, $C_3$-$C_8$ cycloalkyl, phenyl, phenoxy, alkylthio or alkylsulfonyl;

$R_{17}$ and $R_{18}$ are each independently selected from hydrogen or those groups represented by $R_{16}$;

$R_6$ is selected from lower alkylene, alkylene-O-alkylene or alkylene-S-alkylene;

$L_1$ is selected from lower alkylene, alkylene-O-alkylene, alkylene-($C_3$-$C_8$)cycloalkylene-alkylene, alkylene-phenylene-alkylene, alkylene-S-alkylene or $C_3$-$C_8$ cycloalkylene; and $L_2$ is selected from a covalent bond, phenylene, $C_3$-$C_8$ cycloalkylene, —O—, —S—, —$SO_2$—, —$O_2$C-alkylene-$CO_2$— or —$O_2$C-arylene-$CO_2$—.

As noted above, n is an integer of about 2 to about 50. Preferably, n is an integer of about 5 to about 40.

The terms "substituted alkyl" and "substituted alkylene" refer to an alkyl group and an alkylene group, respectively, substituted by any of the groups shown above as substituents on $R_5$, but preferably means alkyl substituted with one or more halogen, phenyl, $C_1$-$C_4$ alkanoyloxy, phenoxy, hydroxy, amino, $C_1$-$C_6$ alkoxycarbonyl, carboxy, alkylsulfonyl, cyclohexyl, carbamoyl, cyano, $C_1$-$C_6$ alkylsulfonylamino or $C_1$-$C_6$ alkoxy groups. The substituted alkyl groups may be substituted one or more times with the same or with different substituents. Preferably, the alkyl portion contains from one to ten carbon atoms, most preferably from one to six carbon atoms.

Examples of the above substituted alkyl groups include cyanoethyl, hydroxyethyl, trityloxymethyl, propionyloxyethyl, aminomethyl, carboxymethyl, allyloxycarbonylmethyl, allyloxycarbonylaminoethyl, carbamoyloxyethyl, methoxyethyl, ethoxyethyl, t-butoxybutyl, acetoxyethyl, chloromethyl, bromohexyl, iodomethyl, 6-hydroxyhexyl, 2,4-dichloro(n-butyl), 2-amino(iso-propyl), 2-carbamoyloxyethyl, chloroethyl, bromoethyl, fluoroethyl, iodoethyl, chloropropyl, bromopropyl, fluoropropyl, iodopropyl, and the like.

The term "aryl" as used herein refers to heterocyclic aryl rings and carbocyclic aryl rings. For example, aryl can be phenyl, naphthyl, phenanthryl, and the like. Aryl can also be 5 or 6-membered heterocyclic aryl rings containing one oxygen atom, and/or one sulfur atom, and up to three nitrogen atoms, said heterocyclic aryl ring optionally fused to one or two phenyl rings. Examples of such ring systems include thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo-[1,5-b]pyridazinyl and purinyl, benzoxazolyl, benzothiazolyl, benzimidazolyl, indolyl and the like.

Accordingly, the term "substituted aryl" refers to such aryl rings substituted by one or more halogen, $C_1$-$C_6$ alkyl, phenoxy, phenyl, hydroxy, amino, $C_1$-$C_6$ alkoxycarbonyl, nitro, $C_1$-$C_6$ alkylsulfonyl, carboxy, cyclohexyl, carbamoyl, cyano, $C_1$-$C_6$ alkylsulfonylamino or $C_1$-$C_6$ alkoxy groups.

The term "arylene" is used to represent a divalent benzene ring and those substituted with the terms mentioned above for substituted aryl.

The term "alkoxycarbonyl" refers to an alkoxy group bonded to a carbonyl function. In other words, the $C_2$ alkoxycarbonyl group is ethoxycarbonyl. The term "substituted alkoxycarbonyl" refers to a $C_1$-$C_6$ alkoxycarbonyl group substituted with one or more halogen, phenyl, phenoxy, hydroxy, amino, $C_1$-$C_6$ alkoxycarbonyl, carboxy, cyclohexyl, carbamoyl, cyano, $C_1$-$C_6$ alkylsulfonylamino, or $C_1$-$C_6$ alkoxy groups.

The terms "alkyl" and "alkylene" as used herein preferably refer to $C_1$-$C_{12}$ straight or branched chain alkyl and alkylene groups, respectively. The terms "lower alkenyl" and "lower alkynyl" refer to $C_3$-$C_6$ alkenyl groups and $C_3$-$C_6$ alkynyl groups, respectively.

The terms "phenylene" and "substituted phenylene" refer respectively to 1,2-; 1,3-; 1,4-phenylene and these divalent radicals substituted with $C_1$-$C_6$ alkyl, $C_1$-$C_6$ alkoxy or halogen.

The term "unsubstituted and substituted carboxylic acid ester" refers to a $C_1$-$C_8$ alkyl, $C_3$-$C_8$ cycloalkyl or aryl oxycarbonyl group, preferably containing from 2 to 10 carbon atoms and optionally substituted with halogen, $C_1$-$C_6$ alkoxy, $C_3$-$C_8$ cycloalkyl, aryl, aryloxy, $C_1$-$C_6$ alkyl, cyano, $C_1$-$C_6$ alkanoyloxy, hydroxy or $C_1$-$C_6$ alkoxycarbonyl.

The term "unsubstituted and substituted carbamoyl" refers to an alkyl (or substituted alkyl) amino carbonyl group, preferably containing from 2 to 10 carbon atoms.

The term "substituted imino" refers to an imino group substituted with a group selected from hydrogen, $C_1$-$C_6$ alkyl, $C_3$-$C_8$ cycloalkyl or aryl.

The term "$Z^-$" refers to any counter anion. Preferably, $Z^-$ is selected from $Br^-$, $Cl$, $I^-$, $CH_3SO_4^-$, or $ZnCl_4^-/2$.

Compounds of Formula (I) can be prepared by the condensation reaction of an aromatic bis-aldehyde with a bis-active methylene compound under Knoevenagel reaction conditions. Bases such as piperidine, piperidine acetate, sodium acetate and pyridine are effective catalysts. Solvents such as alcohols, glycol ethers, N,N-dimethylformamide, N,N-dimethylacetamide and N-methyl-2-pyrrolidinone are convenient. Sometimes with the active methylenes of lesser reactivity, completion of the reaction may be facilitated by use of solvents or co-solvents such as refluxing benzene, toluene or xylene, whereby the water thus formed can be removed azeotropically as it is produced. The preparation of suitable bis-aldehydes has been adequately described earlier. (See, for example, U.S. Pat. Nos. 4,331,584; 3,927,063; 3,879,434; 3,631,049; and 3,553,245, incorporated herein by reference.) The bis-active methylene intermediates are prepared by well-established procedures, or are known already in the chemical literature. (See for example, GB 1,048,348). For example, bis-cyanoacetate compounds are prepared by reaction of cyanoacetic acid and glycols in the presence of acid catalyst as follows:

2NCCH$_2$CO$_2$H + HO—L$_1$—OH 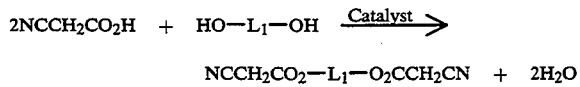

NCCH$_2$CO$_2$—L$_1$—O$_2$CCH$_2$CN + 2H$_2$O

Cyanoacetic esters also may be used to react with the glycols under transesterification conditions to produce the same products. Accordingly, a large variety of active methylene compounds which contain carboxyl or carboxylate ester groups can be reacted with glycols under similar conditions to yield the bis-active methylene compounds useful in the practice of this invention. The corresponding bis-cyanocetamides may also be prepared by reacting cyanoacetic esters with diamines:
$$2NCCH_2CO_2CH_3 + H_2N-L_1-NH_2 \xrightarrow{-2CH_3OH}$$
$$NCCH_2CONH-L_1-NHCOCH_2CN$$
Typical bis-aldehydes and bis-active methylene compounds useful in this context are listed below:
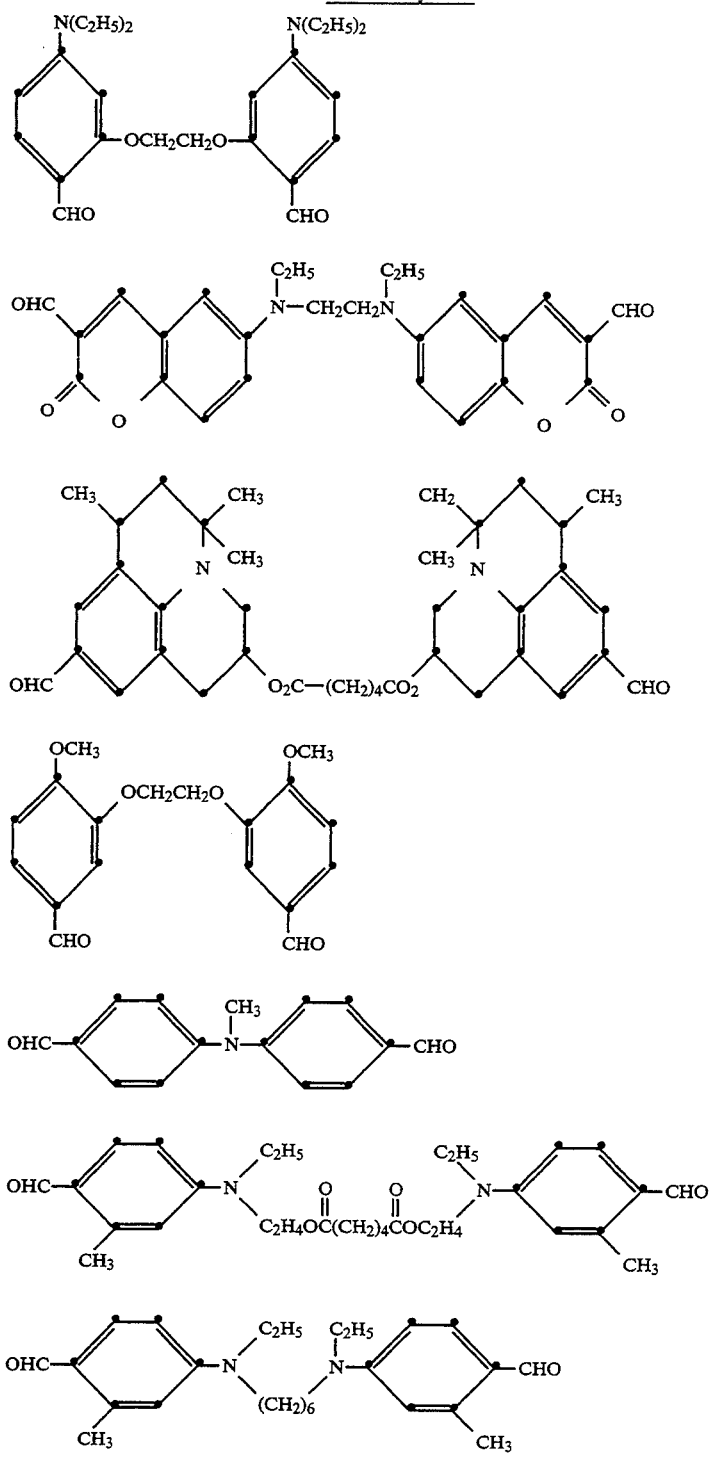

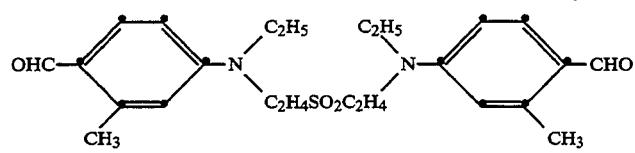
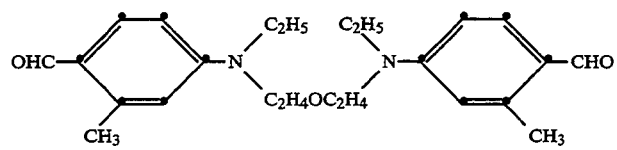
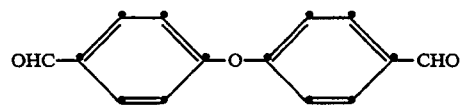
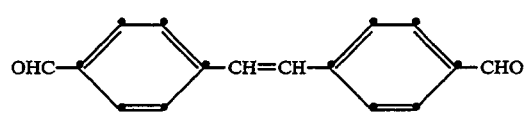
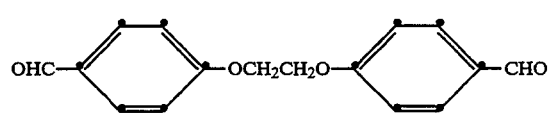
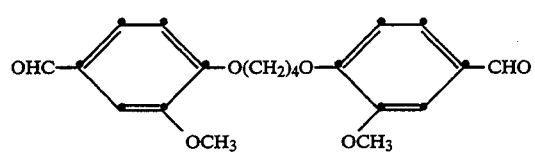
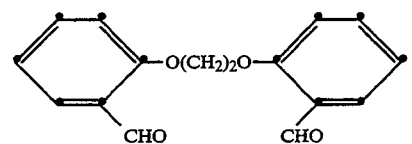
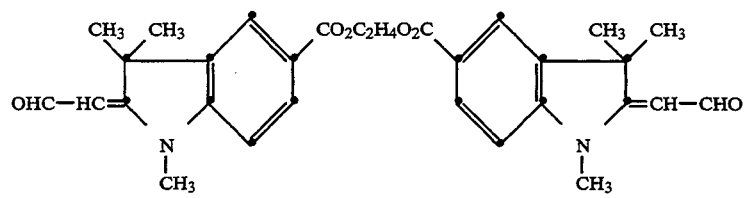
Bis-Active Methylenes
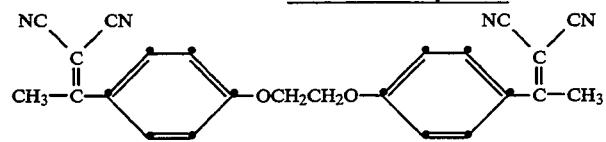
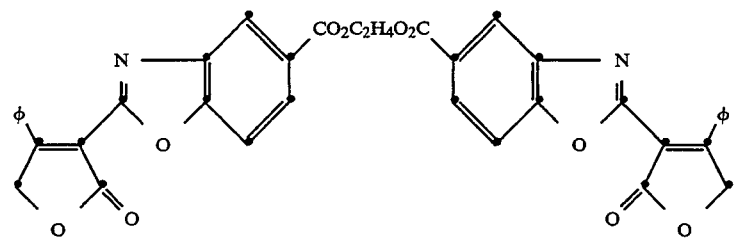

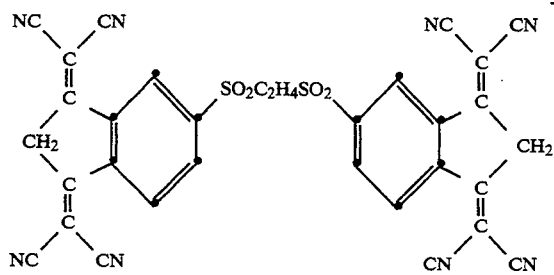
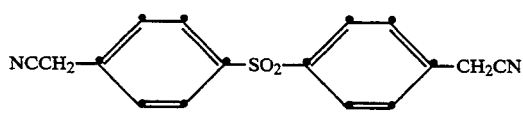
NCCH2CO2CH2CH2O2CCH2CN
NCCH2CONHCH2CH2NHCOCH2CN
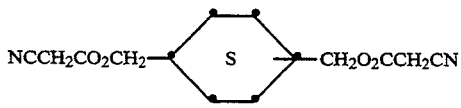
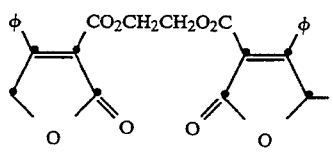
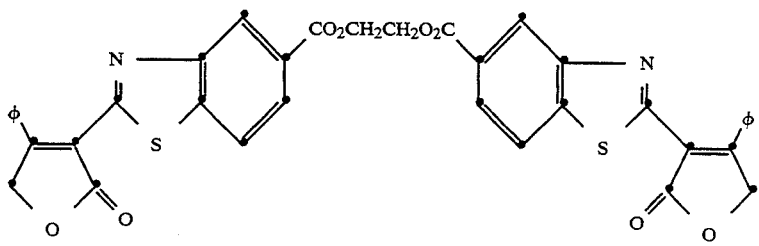
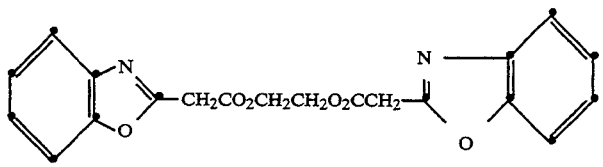
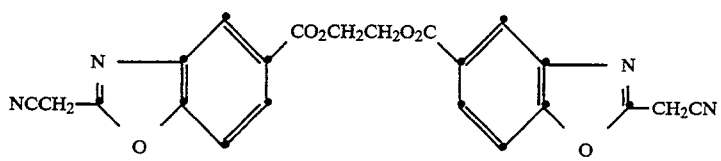
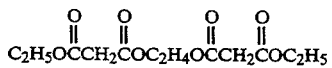

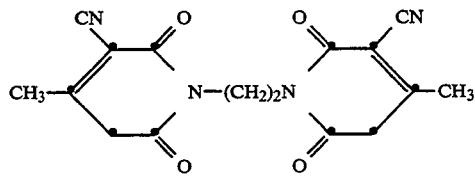

A preparative method for the polymer may be illustrated as follows:

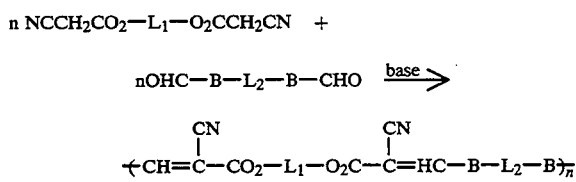

In the above reaction, L₁, L₂, and B are as defined above. Typical solvents and bases useful in this reaction are described above. Usually, the polymers precipitate from the solvents under reaction conditions and are isolated by cooling and collecting by filtration.

As a further aspect of the present invention, there is provided a light-absorbing polymer composition, which comprises one or more thermoplastic polymers and one or more light absorbing polymers represented by Formula (I). Preferably, the compound of Formula (I) is present in at least a concentration of 0.001 weight percent.

Thermoplastic polymers colored by compounds of Formula (I) are characterized by good clarity and brilliance in contrast to compositions colored by the use of insoluble pigments. Polymers represented by repeating residues of Formula (I) have excellent light absorbing properties since they are truly "homopolymeric" in contrast to some of the known colorant compositions which have colorants attached to polymeric moieties which decrease the color yield when these colorant compositions are used to color thermoplastics polymers.

The thermoplastic resin systems useful for blending with the light-absorbing compounds of the present invention include polyesters such as poly(ethylene terephthalate); polyamides such as nylon 6 and nylon 66; polyimides, polyolefins, e.g., polyethylene, polypropylene, polybutylene and copolymers made from ethylene, propylene or butylene. Other thermoplastic polymers include cellulosic resins such as cellulose acetate, cellulose propionate, or cellulose butyrate; polyacrylate resins such as polymethyl methacrylate; polycarbonates; polyurethanes; polystyrene; polyacrylonitrile; polyvinylidene chloride; polyvinyl chloride, etc.

The following Experimental Section is provided to further illustrate the invention but should not be construed as limiting the scope thereof.

EXPERIMENTAL SECTION

EXAMPLE 1

Preparation of Polymeric Methine Yellow Colorant 4,4'-(Methylimino) bis benzaldehyde (0.239 g, 0.001 m), α,α'-dicyano-p-xylene (0.156 g, 0.001 m), N,N-dimethylformamide (2 mL) and a trace of piperidine acetate were mixed and heated at 90°–95° C. for three hours, during which time the yellow polymer precipitated. The reaction mixture was cooled and filtered and the colorant washed with methanol and dried in air (yield 0.26 g). A maximum absorbance at 437 nm was observed in the visible absorption spectrum in methylene chloride. The proposed structure is as follows:

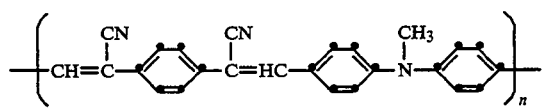

λ max - 437 nm (CH₂Cl₂).

EXAMPLE 2

Preparation of Polymeric UV Light Absorbing Compound

A mixture of 4,4'[(1,2-ethanediyl)bis(oxy)]bis-[benzaldehyde](0.27 g, 0.001 m), α,α'-dicyano-p-xylene (0.156 g, 0.001 m) N,N-dimethylformamide (2 mL) and a trace of piperidine acetate was heated at 90°–95° C. for three hours and then cooled. The pale yellow polymeric product was collected by filtration, washed with methanol and dried in air (yield-0.20 g). An absorption maximum (λ max) was observed at 371 nm in the UV absorption spectrum in methylene chloride. The proposed structure is as follows:

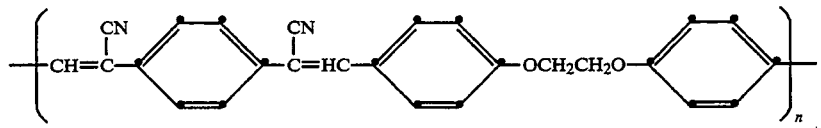

λ max - 371 nm (CH₂Cl₂).

EXAMPLE 3

The following materials were placed in a 500 mL three-necked, round bottom flask:

97 g (0.5 mol) dimethyl terephthalate
62 g (1.0 mol) ethylene glycol
0.00192 g Ti from a n-butanol solution of acetyltriisopropyl titanate
0.0053 g Mn from an ethylene glycol solution of manganese acetate
0.0345 g antimony trioxide 0.0072 g Co from an ethylene glycol solution of cobaltous acetate 0.0384 g polymeric UV absorber of Example 2 (400 ppm)

The flask was equipped with a nitrogen inlet, stirrer, vacuum outlet, and condensing flask. The flask and contents were heated at 200° C. in a Belmont metal bath for 60 minutes and at 210° C. for 75 minutes with a nitrogen sweep over the reaction mixture. Then, 1.57 mL of an ethylene glycol slurry of a mixed phosphorous ester composition (Zonyl A) which contains 0.012 g phosphorous was added. The temperature of the bath was increased to 230° C. and a vacuum with a slow stream of nitrogen blending in the system was applied over a five minute period until the pressure had been reduced to about 200 mm Hg. The flask and contents were heated at about 230° C. under a pressure of about 200 mm Hg for 25 minutes. The metal bath temperature was then increased to about 270° C. At 270° C., the pressure was slowly reduced to about 100 mm Hg and the flask and contents heated at about 270° C. for 30 minutes. The metal bath temperature was increased to 285° C. and the pressure reduced slowly to 4.5 mm Hg. The flask and contents were heated at 285° C. under pressure of 4.5 mm Hg for 25 minutes. Then the pressure was reduced to 0.25 mm Hg and polycondensation continued for 40 minutes. The flask was removed from the metal bath and allowed to cool in a nitrogen atmosphere while the polymer crystallized The resulting polymer had an inherent viscosity of 0.56 as measured in a 60/40 ratio by weight of phenol/tetrachloroethane at a concentration of 0.5 g per 100 mL. An amorphous 13-mil thick film molded from this polymer to simulate the sidewall of a container transmits less than 10% light from 250 to about 400 nm, whereas a 13-mil film prepared from a like polyester without the absorber transmits more than 10% light at all wavelengths above 320 nm. No loss of UV absorber during the polymerization by volatilization was observed.

EXAMPLE 4

The procedure of Example 3 was repeated using 0.0192 g (200 ppm) of the polymeric yellow colorant of Example 2. An amorphous 14-mil thick film is molded from this polymer which has an inherent viscosity of 0.55. In the absorption spectrum on the film, a maximum absorbance is observed at 454 nm. No loss of colorant was observed during the polymerization reaction by volatilization.

EXAMPLE 5

A mixture of 4,4'-(methylimino) bis benzaldehyde (2.39 g, 0.010 m), 1,2-ethanediyl bis(cyanoacetate) (2.94 g, 0.015 m), N,N-dimethylformamide (50.0 mL) and piperidine acetate (0.2 g) was heated and stirred at 90°-95° C. for 2.0 hours during which time the polymeric colorant crystallized. The yellow product (3.2 g) was collected by filtration, washed with methanol and dried in air. The proposed structure is as follows:

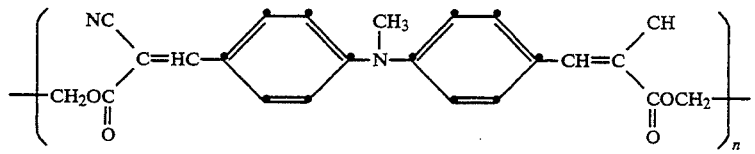

λ max - 446 nm (CH$_2$Cl$_2$).

An absorption maximum at 446 nm was observed in the visible absorption spectrum in methylene chloride. The polymer shows by GPC a weight average molecular weight of 3,261, a number average molecular weight of 2,803, a polydispersity value of 1.16 and by DSC analysis a melting temperature (Tm) of 85.4° C.

EXAMPLE 6

The following materials are placed in a 500 mL three-necked, round bottom flask:

97 g (0.5 mol) dimethyl terephthalate 62 g (1.0 mol) ethylene glycol 0.00192 g Ti from a n-butanol solution of acetyltriisopropyl titanate 0.0053 g Mn from an ethylene glycol solution of manganese acetate 0.0345 g antimony trioxide 0.0072 g Co from an ethylene glycol solution of cobaltous acetate 0.0192 g polymeric colorant of Example 5 (200 ppm)

The flask was equipped with a nitrogen inlet, stirrer, vacuum outlet, and condensing flask. The flask and contents were heated at 200° C. in a Belmont metal bath for 60 minutes at 210° C. for 75 minutes with a nitrogen sweep over the reaction mixture. Then, 1.57 mL of an ethylene glycol slurry of a mixed phosphorous ester composition (Zonyl A) which contains 0.012 g phosphorous was added. The temperature of the batch was increased to 230° C. and a vacuum with a slow stream of nitrogen bleeding in the system was applied over a five minute period until the pressure had been reduced to about 200 mm Hg. The flask and contents were heated at about 230° C. under a pressure of about 200 mm Hg for 25 minutes. The metal bath temperature was then increased to about 270° C. At 270° C., the pressure was slowly reduced to about 100 mm Hg and the flask and contents heated at about 280° C. for 30 minutes. The metal bath temperature was increased to 285° C. and the pressure reduced slowly to 4.5 mm Hg. The flask and contents were heated at 285° C. under pressure of 4.5 mm Hg for 25 minutes. Then the pressure was reduced to 0.25 mm Hg and polycondensation continued for 40 minutes. The flask was removed from the metal bath and allowed to cool in a nitrogen atmosphere while the polymer crystallized. The resulting polymer had an inherent viscosity of 0.60 as measured in a 60/40 ratio by weight of phenol/tetrachloroethane at a concentration of 0.5 g per 100 mL. An amorphous 14 mil thick film was molded from this polymer and the absorption spectrum of the film showed a strong maximum absorbance at 442 nm which indicates good thermal stability of the yellow colorant. No loss of colorant was observed during the polymerization reaction by volatilization.

EXAMPLE 7

Poly(ethylene terephthalate) (Eastman PETG-6763) (300 g) was granulated using a Wiley mill thru a 2 mm screen and then blended with the polymeric colorant of Example 5 (200 ppm) and ethylene glycol (3 g). This blend was dried in a vacuum oven at 60° C. for 16 hours. A 15 mil thick film was prepared using a C. W. Brabender ¾ in. extruder at 280° C. A transparent yellow film was thus produced indicating solubility of the polymeric yellow colorant in the polyester substrate.

EXAMPLE 8

A mixture of 4,4'[(1,2-ethanediyl)bis(oxy)] bis[benzaldehyde] (2.7 g, 0.01 m), 1,2-ethanediyl bis(cyanoacetate) (2.9 g, 0.015 m), N,N-dimethylformamide (50.0 mL) and piperidine acetate (0.1 g) was heated and stirred at about 95° C. for 4.0 hours. The reaction mixture was allowed to cool and the product collected by filtration, washed with methanol and dried in air (yield 2.5 g). The proposed structure is as follows:

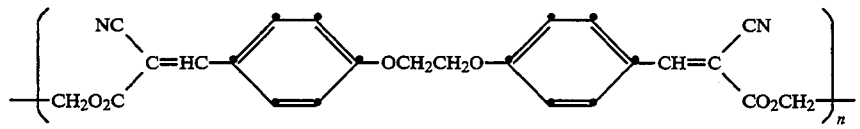

λ max - 349 nm (CH$_2$Cl$_2$).

The polymeric UV absorber has an absorption maximum (λ max) at 349 nm in methylene chloride, a weight average molecular weight of 11,182, a number average molecular weight of 8,060, a polydispersity value of 1.387 and a melting temperature Tm of 275.2° C. by DSC analysis. The inherent viscosity is 0.167.

EXAMPLE 9

A polymer was prepared by reacting 4,4'-[(1,2-ethanediyl) bis(oxy)] bis[benzaldehyde] (2.7 g, 0.01 m) and N,N'-1,2-ethanediylbis (2-cyanoacetamide) (1.94 g, 0.01 m) as described in Example 8 and the polymeric product (4.0 g), having the following proposed structure, was isolated similarly.

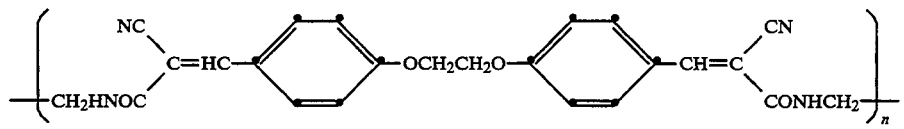

λ max - 346 nm (CH$_2$Cl$_2$).

An absorption maximum λ max) was observed at 346 nm in the visible absorption spectrum in methylene chloride. By GPC analysis the polymer has a weight average molecular weight of 18,970, a number average molecular weight of 9,492, a polydispersity value of 1.998 and a melting temperature Tm by DSC analysis of 101.5° C. The inherent viscosity is 0.243.

EXAMPLE 10

The following materials are placed in a 500 mL three-necked, round bottom flask:

97 g (0.5 mol) dimethyl terephthalate 62 g (1.0 mol) ethylene glycol 0.00192 g Ti from a n-butanol solution of acetyltriisopropyl titanate 0.0053 g Mn from an ethylene glycol solution of manganese acetate 0.0345 g antimony trioxide 0.0072 g Co from an ethylene glycol solution of cobaltous acetate 0.0384 g polymeric UV absorber of Example 8 (400 ppm)

The flask was equipped with a nitrogen inlet, stirrer, vacuum outlet, and condensing flask. The flask and contents were heated at 200° C. in a Belmont metal bath for 60 minutes and at 210° C. for 75 minutes with a nitrogen sweep over the reaction mixture. Then, 1.57 mL of an ethylene glycol slurry of a mixed phosphorous ester composition (Zonyl A) which contains 0.012 g phosphorous was added. The temperature of the batch was increased to 230° C. and a vacuum with a slow stream of nitrogen bleeding in the system was applied over a five minute period until the pressure had been reduced to about 200 mm Hg. The flask and contents were heated at about 230° C. under a pressure of about 200 mm Hg for 25 minutes. The metal bath temperature was then increased to about 270° C. At 270° C., the pressure was slowly reduced to about 100 mm Hg and the flask and contents heated to about 270° C. for 30 minutes. The metal bath temperature was increased to 285° C. and the pressure reduced slowly to 4.5 mm Hg. The flask and contents were heated at 285° C. under pressure of 4.5 mm Hg for 25 minutes. The pressure was then reduced to 0.25 mm Hg and polycondensation continued for 40 minutes. The flask was removed from the metal bath and allowed to cool in a nitrogen atmosphere while the polymer crystallized. The resulting polymer had an inherent viscosity of 0.52 as measured in a 60/40 ratio by weight of phenol/tetrachloroethane at a concentration of 0.5 g per 100 mL. An amorphous 14.0 mil thick film molded from this polyester to simulate the sidewall of a container transmits less than 10% light from 275 to about 370 nm, whereas a 14.0 mil thick film prepared from a like polyester without the UV absorber transmits greater than 10% light at all wavelengths above about 320 nm. This data indicates good thermal stability and low volatility of the polymeric UV absorber.

Examples 11 through 112 further illustrate the scope of the present invention.

TABLE I $$-(CH=A-L_1-A=HC-\underset{\underset{R_4}{|}}{\underset{5\quad 6}{\overset{3\quad 2}{\bigcirc}}}-\underset{R_5}{N}-R_6-L_2-R_6\underset{R_5}{N}-\underset{\underset{R_4}{|}}{\underset{6\quad 5}{\overset{2\quad 3}{\bigcirc}}}-)_n$$

| Ex. No. | A | L₁ |
|---|---|---|
| 11 | $-O_2C-C-(CN)=$ | $-CH_2CH_2-$ |
| 12 | $-O_2C-C(CN)=$ | $-CH_2CH_2CH_2-$ |
| 13 | $-O_2C-C(CN)=$ | $-CH_2CH_2OCH_2CH_2-$ |
| 14 | $-O_2C-C(CN)=$ | $-(CH_2)_6-$ |
| 15 | $-O_2C-C(CN)=$ | $-(CH_2)_4-$ |
| 16 | $-O_2C-C(CN)=$ | $-CH_2-\text{(phenylene)}-CH_2-$ |
| 17 | $-O_2C-C(CN)=$ | $-CH_2-\text{(thiophene)}-CH_2-$ |
| 18 | $-O_2C-C(CN)=$ | $-CH_2-\text{(thiophene)}-CH_2-$ |
| 19 | $-O_2C-C(CN)=$ | $-CH_2CH_2SCH_2CH_2-$ |
| 20 | $-O_2C-C(CN)=$ | $-CH_2CH_2N(CH_3)CH_2CH_2-$ |
| 21 | $-O_2C-C(CN)=$ | $-CH_2CH_2SO_2NHCH_2CH_2-$ |
| 22 | $-O_2C-C(CN)=$ | $-CH_2CH_2O-\text{(phenylene)}-OCH_2CH_2-$ |
| 23 | $-O_2C-C(CN)=$ | $-\text{(thiophene)}-$ |
| 24 | $-O_2C-C(CN)=$ | $-\text{(phenylene)}-$ |
| 25 | $-O_2C-C(CN)=$ | $-CH_2CH_2-$ |
| 26 | $-O_2C-C(CN)=$ | $-CH_2CH_2OCH_2CH_2-$ |
| 27 | $-O_2C-C(SO_2C_2H_5)=$ | $-CH_2CH(CH_3)-$ |
| 28 | $-O_2C-C(SO_2C_6H_5)=$ | $-CH_2CH_2N(SO_2CH_3)CH_2CH_2-$ |
| 29 | $-O_2C-C(=N-\text{benzoxazole})=$ | $-CH_2CH_2N(SO_2C_6H_5)CH_2CH_2-$ |
| 30 | $-O_2C-\text{(benzoxazole with CN)}$ | $-CH_2CH_2-$ |

TABLE I-continued

| | | |
|---|---|---|
| 31 | $-O_2C-C\left\{\begin{array}{c}\text{[isoxazole-Cl-methylphenyl]}\end{array}\right\}=$ | $-CH_2CH_2-$ |
| 32 | $-O_2C-$[methylthiophene with $C(CN)=$ substituent] | $-CH_2CH_2-$ |
| 33 | $-O_2C-C(CO_2C_2H_5)=$ | $-CH_2CH_2-$ |
| 34 | $-O_2C-$[pyranone with $C_6H_5$ substituent]$=$ | $-CH_2CH_2-$ |
| 35 | $-O_2C-$[pyrazolone-$N-CH_3$ with methylene]$=$ | $-CH_2CH_2-$ |
| 36 | [pyrazolone with $N-$, $CH_3$, $=C$]  | $-\text{[C}_6\text{H}_4\text{]}-O(CH_2)_2O-\text{[C}_6\text{H}_4\text{]}-$ |
| 37 | $-O_2C-$[methylphenyl-$SO_2$ with $C=C(CN)_2$]$=$ | $-CH_2CH_2-$ |
| 38 | $-N-$[dioxopyridine with $CH_3$ and $CN$]$=$ | $-CH_2CH_2CH_2CH_2-$ |
| 39 | $-CO-C(CN)=$ | $-\text{[C}_6\text{H}_4\text{]}-$ |
| 40 | $-O_2C-$[C$_6$H$_4$]$-C(CN)=$ | $-CH_2CH_2-$ |

TABLE I-continued

| 41 | [naphthalene-based structure with -O₂C, CH₃, CH₃, CH=, N⁺-CH₃, I⁻] | —CH₂CH₂— |
| 42 | [benzene-based structure with -O₂C, CH₃, CH₃, CH=, N⁺-CH₃, I⁻] | —CH₂CH₂— |
| 43 | —NHCO—C(CN)= | [benzene ring] |
| 44 | —NHCO—C(CN)= | —CH₂CH₂— |
| 45 | —NHCO—C(CN)= | —CH₂—[ring with S]—CH₂— |
| 46 | —SO₂—[benzene ring]—C(CN)= | —CH₂CH₂— |
| 47 | [structure with CN, C=, -O₂, SO₂, C=, benzene ring] | —CH₂CH(Cl)CH₂— |

| Ex. No. | L₂ | R₄ |
| --- | --- | --- |
| 11 | COVALENT BOND | H |
| 12 | —O— | H |
| 13 | —S— | H |
| 14 | —SO₂— | 3-CH₃ |
| 15 | COVALENT BOND | H |
| 16 | —N(SO₂CH₃)— | 3-OCH₃ |
| 17 | [benzene ring] | H |
| 18 | —O—[benzene ring]—O— | H |
| 19 | —S— | H |
| 20 | —N(SO₂C₆H₅)— | 3-CH₃ |
| 21 | —CO₂— | H |

TABLE I-continued

| | | |
|---|---|---|
| 22 | —SO$_2$N(CH$_3$)— | H |
| 23 | —SO$_2$N(C$_6$H$_5$)— | H |
| 24 | —OCH$_2$CH$_2$O— | 2,5-di-OCH$_3$ |
| 25 | —O$_2$C(CH$_2$)$_4$CO$_2$— | |
| 26 |  | 3-CH$_3$ |
| 27 | 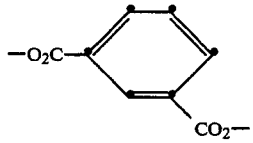 | 2-OCH$_3$/5-CH$_3$ |
| 28 | 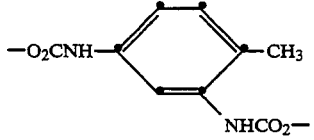 | H |
| 29 | —O$_2$CNH(CH$_2$)$_4$NHCO$_2$— | 3-Cl |
| 30 |  | H |
| 31 | —SO$_2$CH$_2$CH$_2$SO$_2$— | H |
| 32 |  | H |
| 33 | COVALENT BOND | H |
| 34 | —O— | H |
| 35 | COVALENT BOND | H |
| 36 | COVALENT BOND | H |
| 37 | —O$_2$C(CH$_2$)$_2$CO$_2$— | H |
| 38 | —O$_2$CCH$_2$OCH$_2$CO$_2$— | H |
| 39 |  | H |
| 40 | —SO$_2$NHCH$_2$CH$_2$NHO$_2$S— | H |
| 41 | —O— | H |
| 42 | —S— | H |
| 43 | COVALENT BOND | H |
| 44 | COVALENT BOND | H |
| 45 | COVALENT BOND | H |
| 46 | O | H |
| 47 | O | H |

| Ex. No. | R$_5$ | R$_6$ |
|---|---|---|
| 11 | C$_2$H$_5$ | —CH$_2$CH$_2$— |
| 12 | CH$_3$ | —CH$_2$CH$_2$— |
| 13 | C$_4$H$_9$-n | —CH$_2$CH$_2$— |
| 14 | C$_2$H$_5$ | —CH$_2$CH$_2$— |
| 15 | C$_6$H$_{11}$ | —CH$_2$— |
| 16 | CH$_2$C$_6$H$_{11}$ | —CH$_2$CH$_2$— |
| 17 | CH$_2$C$_6$H$_5$ | —CH$_2$— |
| 18 | CH$_2$C$_6$H$_4$-p-OCH$_3$ | —CH$_2$CH$_2$— |
| 19 | CH$_2$CH$_2$C$_6$H$_5$ | —CH$_2$CH$_2$CH$_2$CH$_2$— |
| 20 | —CH$_2$CH$_2$OC$_6$H$_5$ | —CH$_2$CH$_2$OCH$_2$CH$_2$— |
| 21 | —CH$_2$CH$_2$CN | —CH$_2$CH$_2$— |

TABLE I-continued

| | | |
|---|---|---|
| 22 | —CH₂CH(CH₃)₂ | —CH₂—C₆H₄—CH₂— |
| 23 | —CH₂CH₂CN | —CH₂—(thiophene-2,5-diyl)—CH₂— |
| 24 | —CH₂CH₂CH₂SO₂CH₃ | —CH₂CH₂— |
| 25 | —CH₂CH₃ | —CH₂CH₂— |
| 26 | —CH₂CH₂Cl | —CH₂CN(CH₃)— |
| 27 | —CH₂CH₂OCH₃ | —CH₂CH(C₆H₅)— |
| 28 | —CH₂CH₂N(COCH₂)(CONH) (hydantoin) | —CH₂CH₂— |
| 29 | —CH₂CH₂N(CO—CH₂)(CO—O) (oxazolidinedione) | —CH₂CH₂— |
| 30 | —CH₂CH₂S—C₆H₄—Cl | —CH₂CH₂CH₂— |
| 31 | —CH₂CH₂S—C(=N-)—S (benzothiazole) | —CH₂CH₂— |
| 32 | —CH₂CH₂S—(pyridyl) | —CH₂CH₂— |
| 33 | —CH(CH₃)₂ | —CH₂CH₂— |
| 34 | —C₂H₅ | —CH₂CH₂— |
| 35 | —C₆H₅ | —CH₂CH₂— |
| 36 | —C₆H₄-p-OCH₃ | —CH₂CH₂— |
| 37 | —C₂H₅ | —CH₂CH₂— |
| 38 | —C₂H₅ | —CH₂CH₂— |
| 39 | —C₂H₅ | —CH₂—C₆H₄—CH₃ |
| 40 | —C₂H₅ | —CH₂CH₂O—C₆H₄— |
| 41 | —C₂H₅ | —CH₂CH₂— |
| 42 | —C₆H₅ | —CH₂CH₂— |
| 43 | —C₂H₅ | —CH₂— |
| 44 | —C₂H₅ | —CH₂CH₂— |
| 45 | —C₆H₅ | —CH₂CH₂CH₂— |
| 46 | —C₆H₄ | —CH₂CH₂— |
| 47 | —CH₂CH₂OC₆H₅ | —CH₂CH₂— |

TABLE II $$\{CH\!=\!A\!-\!L_1\!-\!A\!=\!HC\!-\!B\!-\!L_2\!-\!B\}_n$$

| Ex. No. | A | $L_1$ | B | $L_2$ |
|---|---|---|---|---|
| 48 | —O$_2$C—C—(CN)= | —CH$_2$CH$_2$— | ![B48] 2-methyl-N-CH$_2$CH$_2$— tetrahydroquinoline | —O— |
| 49 | —O$_2$C—C—(CN)= | —(CH$_2$)$_4$— | ![B49] dimethyl-tetrahydroquinoline N—CH$_2$— | COVALENT BOND |
| 50 | —O$_2$C—C—(CN)= | —(CH$_2$)$_6$— | ![B50] trimethyl-tetrahydroquinoline N—CH$_2$CH$_2$— | COVALENT BOND |
| 51 | —O$_2$C—C—(CN)= | —(CH$_2$)$_8$— | ![B51] tetramethyl-tetrahydroquinoline N—CH$_2$—CH$_2$— | —O— |

TABLE II-continued $\{CH=A-L_1-A=HC-B-L_2-B\}_n$

| Ex. No. | A | L₁ | B | L₂ |
|---|---|---|---|---|
| 52 | —O₂C—C(CN)= | —CH₂CH₂CH₂— | 2,5-dimethylphenyl with CH(CH₃)CH₂C(CH₃)₃ and N(C₂H₄—)(CH₂CH₂—) substituents | —O— |
| 53 | —O₂C—C(CN)= | 1,4-bis(CH₂)-thiophene ring | 2-methyl-4-(C(CH₃)₂CH₂C(CH₃)₃)-phenyl with N(C₂H₄—)(CH₂CH₂—) | —O₂C(CH₂)₄CO₂— |
| 54 | —NHCO—C(CN)= | 3,4-dimethylphenyl | 2,5-dimethylphenyl-CH(CH₃)-N(CH₂CH₂—)₂ | 1,4-phenylene-bis(—CO₂—) |
| 55 | —O₂C—C(SO₂(2-Cl,4-Cl-phenyl))= | —CH₂CH₂CH₂CH₂— | 2-methyl-4-(OCH(CH₃)-)-phenyl-N(CH₃)(CH₂CH₂—) | 2,5-thiophene-bis(—CO₂—) |
| 56 | —O₂C—C(CN)= | —CH₂CH₂— | 4-(OCH₂CH₂—)phenyl | COVALENT BOND |

TABLE II-continued $$\{CH=A-L_1-A=HC-B-L_2-B\}_n$$

| Ex. No. | A | $L_1$ | B | $L_2$ |
|---|---|---|---|---|
| 57 | 2-chloro-6-(N=C)-phenyl-O-C(=O)- | —CH$_2$CH$_2$— | 4-(—OCH$_2$—)-phenyl | COVALENT BOND |
| 58 | —O$_2$C—C(CN)= | —CH$_2$CH$_2$OCH$_2$CH$_2$— | 3-methoxy-4-(—OCH$_2$—)-phenyl | COVALENT BOND |
| 59 | —O$_2$C—C(SO$_2$CH$_3$)= | —CH$_2$CH(CH$_3$)— | 3-(—OCH$_2$—)-phenyl | COVALENT BOND |
| 60 | —O$_2$C—C(SO$_2$C$_6$H$_4$-p-CH$_3$)= | —CH$_2$CH$_2$SCH$_2$CH$_2$— | 4-(—OCH$_2$—)-phenyl | 1,4-phenylene |
| 61 | —O$_2$C—C(CO$_2$C$_2$H$_5$)= | —CH$_2$CH$_2$N(SO$_2$CH$_3$)CH$_2$— | 3-methoxy-4-(—OCH$_2$CH$_2$—)-phenyl | —O$_2$C—(CH$_2$)$_2$CO$_2$— |

TABLE II-continued
$$(CH=A-L_1-A=HC-B-L_2-B)_{\overline{n}}$$
| Ex. No. | A | L₁ | B | L₂ |
|---|---|---|---|---|
| 62 | —O₂C—C(CN)= | —CH₂CH₂O— | 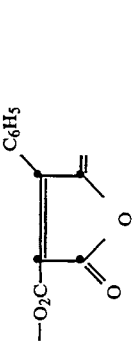 | COVALENT BOND |
| 63 | 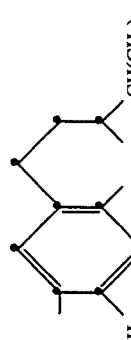 | —CH₂CH₂— | 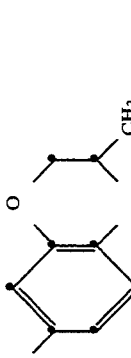 | —O— |
| 64 | —HNOC— 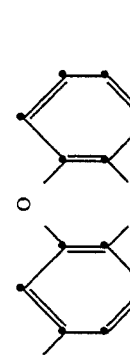 | —CH₂CH₂— | 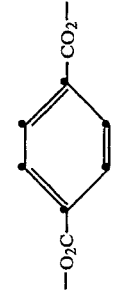 | COVALENT BOND |
| 65 | | | | |

TABLE II-continued $(CH=A-L_1-A=HC-B-L_2-B)_n$

| Ex. No. | A | $L_1$ | B | $L_2$ |
|---|---|---|---|---|
| 66 | (bracketed phenyl-N(CH₃)-N=C-C-O₂C— structure) | —CH₂CH₂— | (biphenyl with N-CH₂—) | COVALENT BOND |
| 67 | —CO—(CN)= | (phenylene) | (N=C(CH₃)₂, N(C₂H₅)(C₂H₄—), S) | —NHCO₂— / phenyl-CH₃ / —O₂CNH— ; —O₂C—(CH₂)₄CO₂— |
| 68 | (pyrimidinedione with CH₃, CN) | —CH₂CH₂— | (phenyl with CH₃, CH₃, N—CH₃, —CH—) | |
| 69 | (pyrimidinedione with CH₃, CN) | (thiopyran —CH₂—S—CH₂—) | (phenyl-N(C₂H₅)₂, —CH₂—) | —O₂CH₂CH₂CO₂— |
| 70 | —O₂C—phenyl—C(CN)= | —CH₂CH₂SO₂CH₂CH₂— | (phenyl-N(CH₃)₂, —OCH₂O—) | —O₂C—phenyl—CO₂— |

TABLE II-continued $(CH=A-L_1-A=HC-B-L_2-B)_n$

| Ex. No. | A | $L_1$ | B | $L_2$ |
|---|---|---|---|---|
| 71 | 3-(SO$_2$—), 5-(=C(CN))—C$_6$H$_4$ | —CH$_2$CH$_2$N(CH$_3$)CH$_2$CH$_2$— | 8-(N(C$_2$H$_5$)(C$_2$H$_4$—))-naphth-1-yl | —O$_2$CO— |
| 72 | 2-methyl-4-(—O$_2$C), 5-(SO$_2$), 1-(C(=NH)(CN))C$_6$H$_3$ | —CH$_2$CH$_2$— | 2-(N(CH$_3$)$_2$), 5-(CH$_2$—)-C$_6$H$_3$ | —OCH$_2$CH$_2$O— |
| 73 | 4-(N(SO$_2$C$_6$H$_5$)), 1-(=C(CN))—C$_6$H$_4$ | —CH$_2$CH$_2$— | 1-(OCH$_2$—), 2-(OC$_2$H$_5$)-C$_6$H$_4$ | COVALENT BOND |
| 74 | 3-(—HNO$_2$S), 1-(=C(CN))—C$_6$H$_4$ | —CH$_2$CH$_2$— | 8-(N(C$_2$H$_5$)(CH$_2$CH$_2$OCH$_2$CH$_2$—)), 4-(CH$_3$O)-naphth-1-yl | —O— |

TABLE III
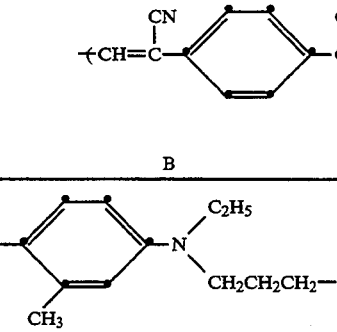
| Ex. No. | B | L$_2$ |
|---|---|---|
| 75 | 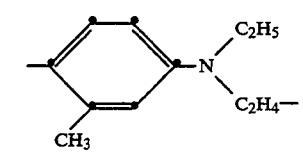 | COVALENT BOND |
| 76 | 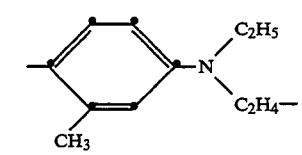 | —SO$_2$— |
| 77 | 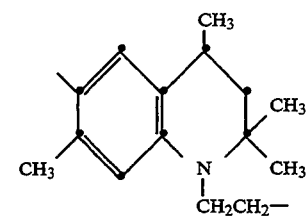 | —O$_2$C—(CH$_2$)$_4$—CO$_2$— |
| 78 |  | —O$_2$C—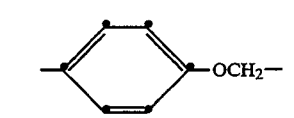—CO$_2$— |
| 79 | 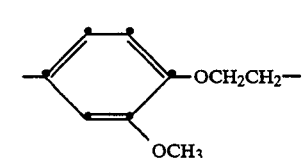 | COVALENT BOND |
| 80 | 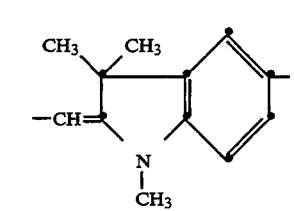 | COVALENT BOND |
| 81 | 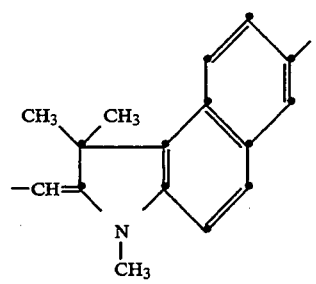 | —CO$_2$—CH$_2$CH$_2$—O$_2$C— |
| 82 | | —CO$_2$—(CH$_2$)$_6$—CO$_2$— |

TABLE III-continued $$+CH=\underset{CN}{C}-\underset{}{\phantom{x}}\underset{}{\bigcirc}-C=HC-B-L_2-B\underset{\overline{n}}{\big)}$$
(with CN on both vinyl carbons)

| Ex. No. | B | $L_2$ |
|---|---|---|
| 83 | 2,4-dimethylphenyl-N(CH(CH₃)—O—)CH₂CH₂— | $-CO_2(CH_2)_4CO_2-$ |
| 84 | —C₆H₃(OCH₃)(OCH₂—) | $-CO_2-CH_2CH_2-O_2C-$ |
| 85 | —C₆H₄—OCH₂—C₆H₄— | $-CO_2-CH_2CH_2-O_2C-$ |

TABLE IV $+CH=A-L_1-A=HC+$ with two phenyl rings bearing $L_4$, $R_4$, $R_{10}$ substituents

| Ex. No. | A | $L_1$ | $L_4$ | $R_4$ | $R_{10}$ |
|---|---|---|---|---|---|
| 86 | $-O_2C-C(CN)=$ | $-CH_2-$ | $-CH_2, O$ | H | H |
| 87 | $-O_2C-C(CO_2CH_3)=$ | $-CH_2-$ | $-CH_2, O$ | H | H |
| 88 | $-O_2C-C(CONHC_6H_5)=$ | $-CH_2CH_2-$ | $-CH_2, O$ | 3-CH$_3$ | 3-CH$_3$ |
| 89 | 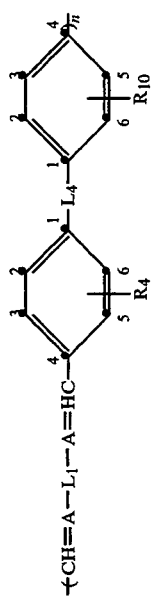 | $-CH_2-$ | $-(CH_2)_6$ | 3-Cl | 3-Cl |
| 90 | $-O_2C-C(SO_2CH_3)=$ | $-(CH_2)_8-$ | $-CH_2, S$ | 3-OCH$_3$ | 3-OCH$_3$ |
| 91 | $-O_2C-C(SO_2C_6H_5)=$ | $-CH_2O-CH_2C-H_2O-$ | $-CH_2, O$ | H | 3-CH$_3$ |
| 92 | $-NHOC-C(CN)=$ | $-CH_2-$ | $-CH_2, O$ | 3-CH$_3$ | 3-Br |
| 93 | phenyl-$C(CN)=$, $-O_2C$ | $-CH_2-$ | thiopyran with $-CH_2-$ linkages | H | H |
| 94 | thiazole-$C(CN)=$, $-O_2C$ | $-CH_2CH_2N-$ | pyridine with $-OCH_2CH_2-$, $-CH_2CH_2N-$ | H | H |

TABLE IV-continued $+CH=A-L_1-A=HC$ [phenyl ring with positions 1,2,3,4,5,6, L_4 at position 1, R_10 at position 5]
[phenyl ring with positions 1,2,3,4,5,6, position 4 linked, R_4 at position 5]

| Ex. No. | A | L_1 | L_4 | R_4 | R_10 |
|---|---|---|---|---|---|
| 95 | [pyridine ring with N, C(CN)= group and -O_2C substituent, O in ring] | -CH_2CH_2N(SO_2CH_3)-CH_2CH_2- | | H | H |
| 96 | [furanone ring with C_6H_5 and -O_2C substituents, C=O] | -CH_2- | -CH=CH- | 2-OCH_3/5-CH_3 | 2-OCH_3/5-CH_3 |
| | | -CH_2S-CH_2CH_2- | | | |
| 97 | [furanone ring with C_6H_5 and -HNOC substituents, C=O] | -CH_2CH_2- | [piperazine ring: -N...N-] | H | H |
| 98 | [phenyl ring with -SO_2- and C(CN)= substituents] | -CH_2CH_2- | [piperazine ring: -N...N-] | H | H |

TABLE V

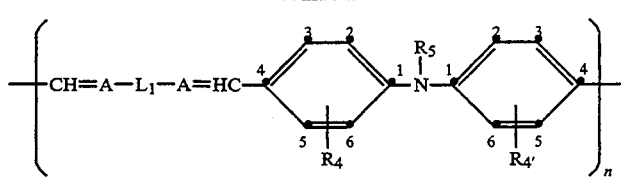

| Ex. No. | A | $L_1$ | $R_4$ | $R_4'$ | $R_5$ |
|---|---|---|---|---|---|
| 99 | $-O_2C-C(CN)=$ | $-CH_2CH_2-$ | H | H | $CH_3$ |
| 100 | $-O_2C-C(CO_2CH_3)=$ | $-(CH_2)_4-$ | H | H | $C_2H_5$ |
| 101 | $-O_2C-C(SO_2CH_3)=$ | $-(CH_2)_6-$ | H | H | $C_2H_4Cl$ |
| 102 | 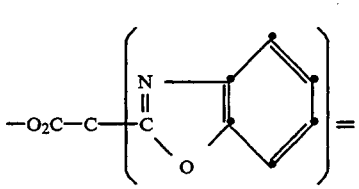 | $-CH_2CH_2OCH_2CH_2-$ | H | H | $C_2H_4OCOCH_3$ |
| 103 | 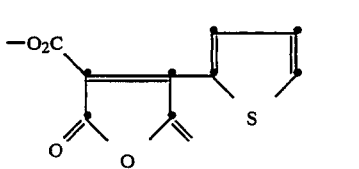 | 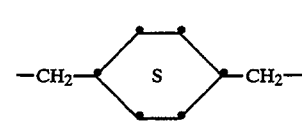 | H | H | $C_2H_4OC_2H_5$ |
| 104 | $-O_2CC(CONHC_6H_5)=$ | $-CH_2CH_2-$ | H | H | $CH_2C_6H_5$ |
| 105 | $-NHCO-C(CN)=$ | $-CH_2CH_2-$ | H | H | $C_6H_5$ |
| 106 | $-O_2C-C(CN)=$ | $-CH_2CH_2-$ | 3-$CH_3$ | H | $C_6H_4$-p-$CH_3$ |
| 107 | $-O_2C-C(CN)=$ | $-CH_2CH_2-$ | 3-$OCH_3$ | H | $CH_3$ |
| 108 | $-O_2C-C(CN)=$ | $-(CH_2)_6-$ | 3-Cl | 3-$CH_3$ | $C_4H_9$-n |
| 109 | 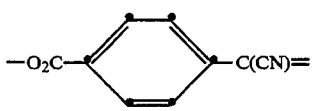 | $-(CH_2)_8-$ | 3-$OC_2H_5$ | 3-$OCH_3$ | $CH_2CH_2CN$ |
| 110 | 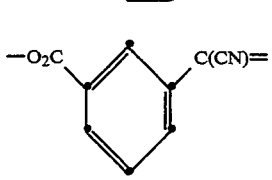 | $-CH_2CH_2-$ | 3-Br | 3-Cl | $CH_2C_6H_{11}$ |
| 111 | 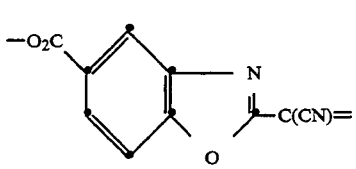 | $-(CH_2)_3-$ | H | H | $CH_2CH_2C_6H_5$ |
| 112 | 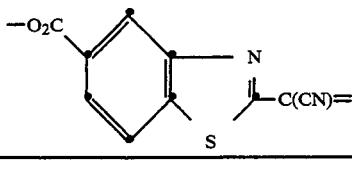 | $-(CH_2)_8-$ | H | H | $CH_3$ |

TABLE VI $$\{CH=A-L_1-A=HC-B-L_2-B\}_{\overline{n}}$$

| Ex. No. | =A—L₁—A= | B—L₂—B— |
|---|---|---|
| 113 | (structure: two phenyl rings linked by OCH₂CH₂O, each with N=C(CN) group forming cyclic imide) | (structure: two phenyl rings linked by -(CH₂)₆-, each N-substituted with C₂H₅ groups) |
| 114 | (structure: two phenyl rings linked by CO₂C₂H₄CO₂, each with N=C(φ) attached to dioxo ring) | (structure: two phenyl rings linked by C₂H₄SO₂C₂H₄N, with N-C₂H₅ substituents) |
| 115 | (structure: two phenyl rings linked by CO₂C₂H₄CO₂, each with N=C(S)(φ) attached to dioxo ring) | (structure: two tetrahydroquinoline units with gem-dimethyl groups, linked by OCH₂CH₂O) |
| 116 | =C(CN)—CO₂C₂H₄CO₂—C(CN)= | (structure: two tetrahydroquinoline units linked by O₂CC₂H₄CO₂) |

TABLE VI-continued $(CH=A-L_1-A=HC-B-L_2-B)_n$

| Ex. No. | =A—L₁—A= | B—L₂—B— |
|---|---|---|
| 117 | | |
| 118 | | |
| 119 | | |
| 120 | | |

TABLE VI-continued $+CH=A-L_1-A=HC-B-L_2-B\rangle_n$

| Ex. No. | =A—L₁—A= | B—L₂—B— |
|---|---|---|
| 121 | [structure with SO₂C₂H₄SO₂ linker between two dicyanomethylene-containing bicyclic groups] | [structure: N(C₂H₅)₂—phenyl—OCH₂—phenyl—CH₂O—phenyl—N(C₂H₅)₂] |
| 122 | [structure with CO₂C₂H₄O₂C linker between two tris(dicyanomethylene)-containing bicyclic groups] | [structure: two rings connected via N—CH(CH₃)—C₂H₄O₂C(CH₂)₂CO₂C₂H₄—N—CH(CH₃)] |
| 123 | [hydantoin-type structure with N—CH₃ and N—CH₂CH₂N linkage] | [structure: (C₂H₅)(C₂H₄O₂CC₂H₄)N—phenyl—N(C₂H₅)(C₂H₄O₂CC₂H₄)—phenyl—CH₃] |
| 124 | [structure: NC(CN)C=phenyl=C(CN)CN] | [structure with two O=C—N—CH(φ) groups linked by N—CH₂CH₂—N] |

TABLE VI-continued $+CH=A-L_1-A=HC-B-L_2-B\frac{}{n}$

| Ex. No. | =A—L$_1$—A= | B—L$_2$—B— |
|---|---|---|
| 125 | (structure with CN groups and =C—CO$_2$(CH$_2$)$_4$—O$_2$C—C= linker) | (bis-coumarin structure linked by —OCH$_2$CH$_2$O—) |
| 126 | (thiophene-linked bis-cyanoacetate structure with CN and CO$_2$CH$_2$ groups) | (bis-coumarin linked via —N(C$_2$H$_5$)—CH$_2$CH$_2$—N(C$_2$H$_5$)— bridge between aniline rings) |
| 127 | (bis-phenyl structure with CN, SO$_2$CH$_3$, lactone rings and —N(SO$_2$CH$_3$)—C$_2$H$_4$—N(SO$_2$CH$_3$)— bridge) | (bis-aniline linked via —N(C$_2$H$_5$)—C$_2$H$_4$OC$_2$H$_4$—N(C$_2$H$_5$)—) |
| 128 | (phenylene bis-dicyanomethylene structure) | (bis-pyrrole/furan type structure with φ substituents linked by —N—C$_2$H$_4$O$_2$C—(phenyl)—CO$_2$C$_2$H$_4$N—) |

TABLE VI-continued
$+CH=A-L_1-A=HC-B-L_2-B)_n$
| Ex. No. | =A—L$_1$—A= | B—L$_2$—B— |
|---|---|---|
| 129 | 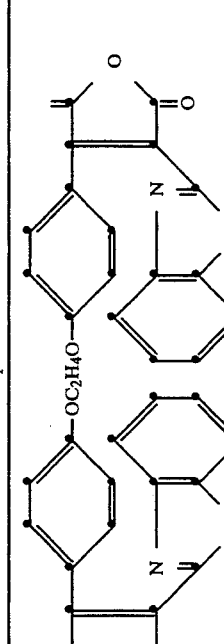 | 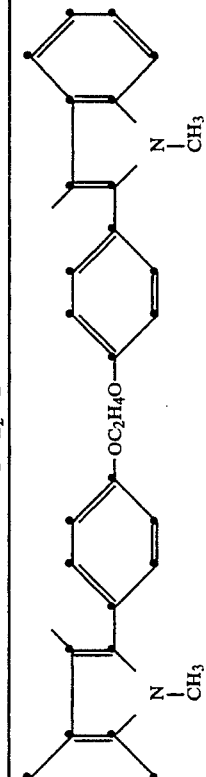 |
| 130 | 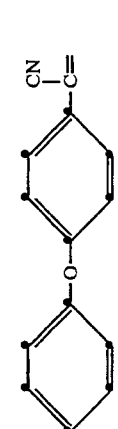 |  |

We claim:
1. light-absorbing thermoplastic polymer composition, which comprises a thermoplastic polymer blended with a non-protonated light absorbing polymer represented by Formula (I)

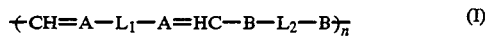  (I)

wherein

A is selected from the the group consisting of

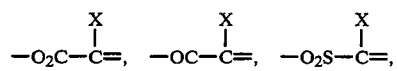

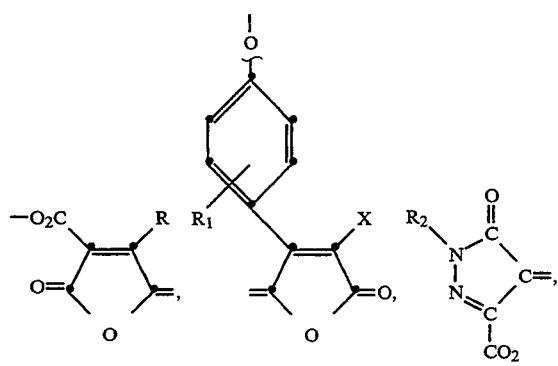

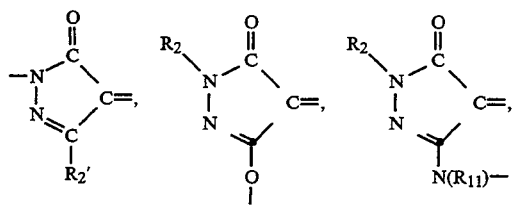

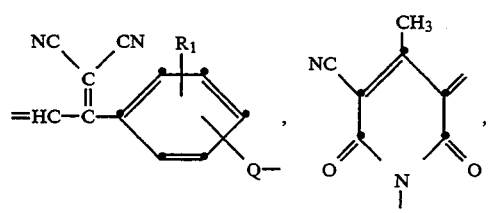

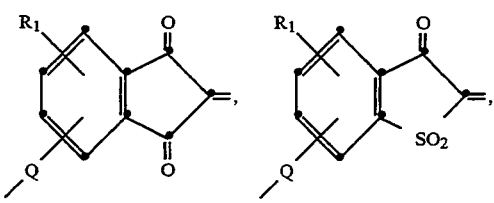

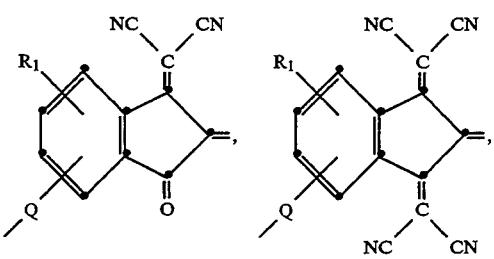

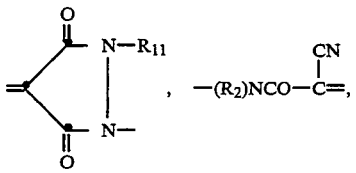

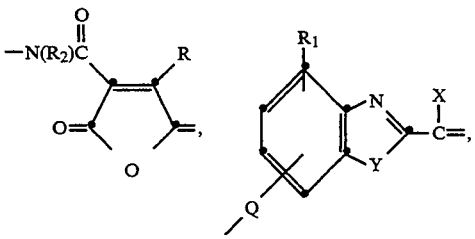

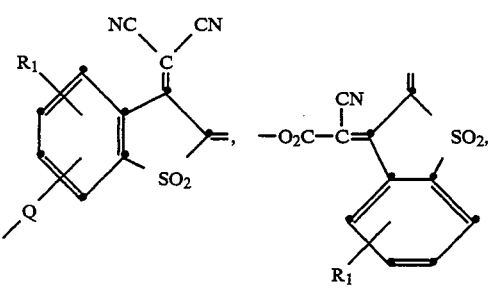

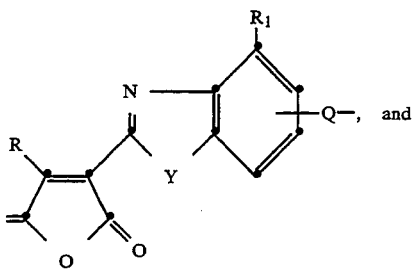

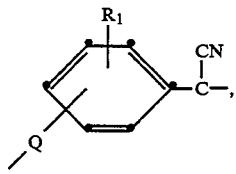

wherein

Q is selected from the group consisting of a covalent bond, $-CO_2$, $-CO-$, $-S-$, $-O-$, $-CON(R_2)-$, $-N(SO_2R_3)-$, $SO_2$ and $-SO_2N(R_2)-$;

X is selected from the group consisting of cyano; a $C_1-C_8$ alkyl, $C_3-C_8$ cycloalkyl or aryl oxycarbonyl group, containing from 2 to 10 carbon atoms and optionally substituted with halogen, $C_1-C_6$ alkoxy, $C_3-C_8$ cycloalkyl, aryl, aryloxy, $C_1-C_6$ alkyl, cyano, $C_1-C_6$ alkanoyloxy, hydroxy or $C_1-C_6$ alkoxycarbonyl; a carbamoyl group containing from 2 to 10 carbon atoms; $C_1-C_{12}$ alkylsulfonyl; $C_3-C_8$ cycloalkylsulfonyl; arylsulfonyl or a carbocylic or heterocyclic aryl selected from the group consisting of phenyl, naphthyl, phenanthryl, thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo-pyridazinyl, purinyl, benzoxazolyl, benzothiazolyl, benzimidazolyl, and indolyl;

Y is selected from the group consisting of —O—, —S—, —NH— and an imino group substituted with a group selected from the group consisting of hydrogen, $C_1$–$C_6$ alkyl, $C_3$–$C_8$ cycloalkyl and aryl;

R is hydrogen, or a carbocyclic or heterocyclic aryl selected from the group consisting of phenyl, naphthyl, phenanthryl, thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolopyridazinyl, purinyl, benzoxazolyl, benzothiazolyl, benzimidazolyl, and indolyl;

$R_1$ is hydrogen or halogen;

$R_2$ is selected from the group consisting of hydrogen, $C_3$–$C_8$ cycloalkyl and a carbocyclic or heterocyclic aryl selected from the group consisting of phenyl, naphthyl, phenanthryl, thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo-[1,5-b]pyridazinyl, purinyl, benzoxazolyl, benzothiazolyl, benzimidazolyl, and indolyl;

$R_2'$ is —$OR_3$, —$NHR_3$, or one of the groups listed for $R_2$;

$R_3$ is selected from the group consisting of $C_1$–$C_{12}$ alkyl; $C_1$–$C_{12}$ alkyl substituted by one group selected from the group consisting of halogen, phenyl, $C_1$–$C_4$ alkanoyloxy, phenoxy, hydroxy, amino, $C_1$–$C_6$ alkoxycarbonyl, carboxy, alkylsulfonyl, cyclohexyl, carbamoyl, cyano, $C_1$–$C_6$ alkylsulfonylamino or $C_1$–$C_6$ alkoxy; $C_3$–$C_8$ cycloalkyl and a carbocyclic or heterocyclic aryl selected from the group consisting of phenyl, napthyl, phenanthryl, thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo-[1,5-]pyridazinyl, purinyl, benzoxazolyl, benzothiazolyl, benzimidazolyl, and indolyl;

or wherein =A—$L_1$—A= in combination has the structure =C(CN)-arylene-C(CN)=;

and wherein the divalent moiety B is a divalent organic moiety which contains at least one carbocyclic or heterocyclic aromatic ring which is attached to a methylidine moiety and is represented by one of the following formulae:

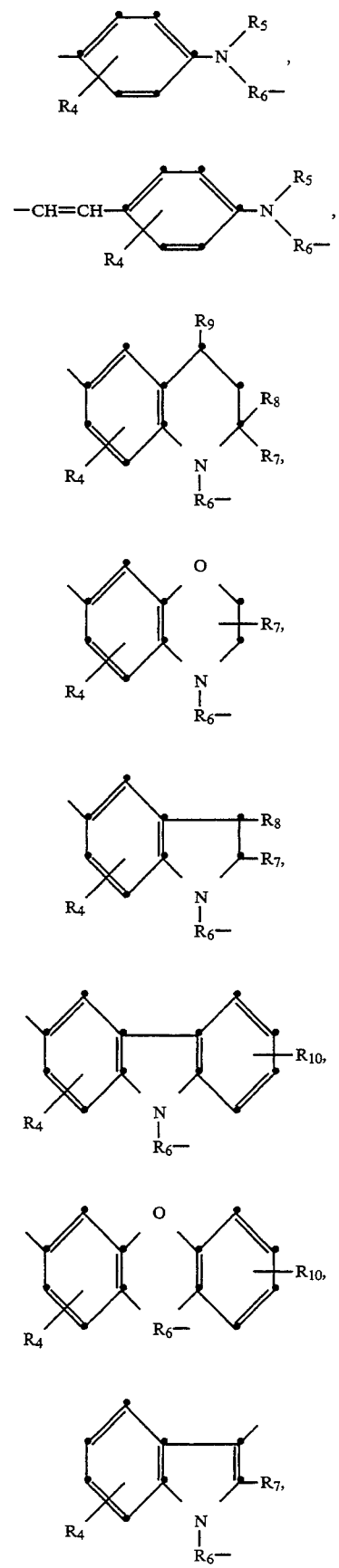

-continued
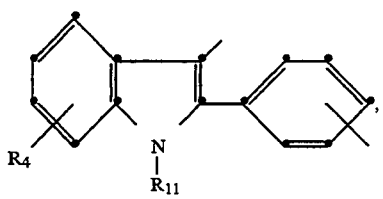
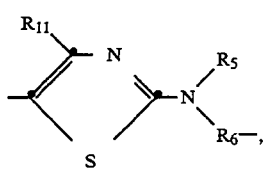
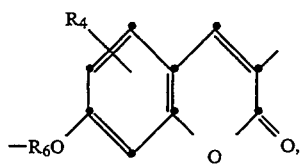
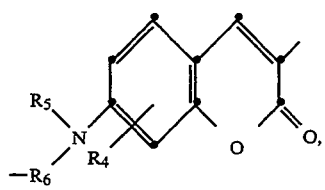
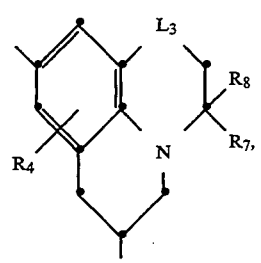
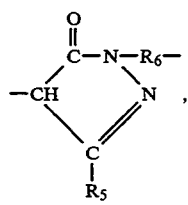
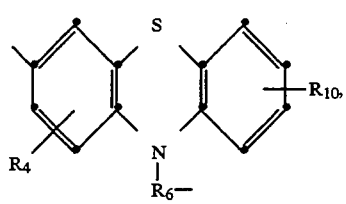
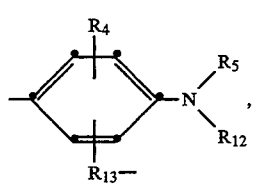
-continued
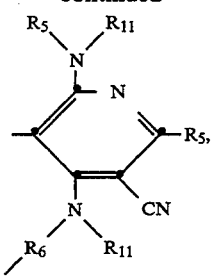
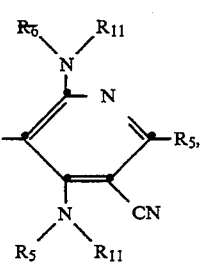
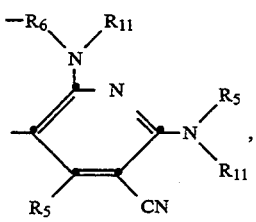
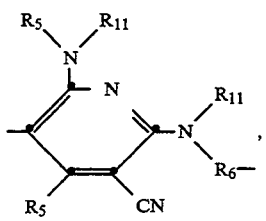
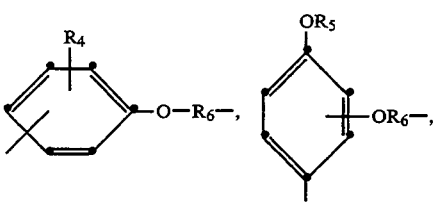
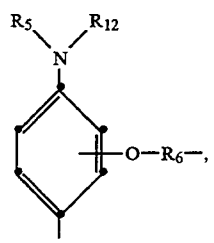
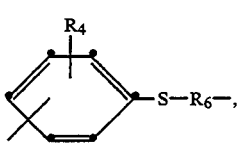

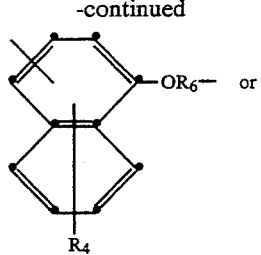

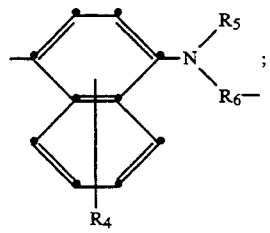

wherein

R$_4$ and R$_{10}$ are hydrogen or halogen;

R$_5$ and R$_{12}$ are selected from the group consisting of C$_3$-C$_6$ alkenyl, C$_3$-C$_6$ alkynyl, C$_3$-C$_8$ cycloalkyl, and phenyl;

R$_6$ is selected from the group consisting of C$_3$-C$_8$ cycloalkylene, arylene, C$_1$-C$_{12}$ alkylene-arylene-C$_1$-C$_{12}$alkylene, C$_1$-C$_{12}$ alkylene-(C$_3$-C$_8$)cycloalkylene-C$_1$-C$_{12}$ alkylene, C$_1$-C$_{12}$ alkylene-O—C$_1$-C$_{12}$ alkylene, C$_1$-C$_{12}$ alkylene-S-C$_1$-C$_{12}$ alkylene, C$_1$-C$_{12}$ alkylene-SO$_2$—C$_1$-C$_{12}$ alkylene, C$_1$-C$_{12}$ alkylene-O-arylene-O—C$_1$-C$_{12}$ alkylene, C$_1$-C$_{12}$ alkylene-N(SO$_2$R$_3$)C$_1$-C$_{12}$ alkylene and C$_1$-C$_{12}$ alkylene-arylene;

R$_7$, R$_8$, R$_9$ are hydrogen or C$_1$-C$_{12}$ alkyl;

R$_{11}$ is hydrogen or aryl;

R$_{13}$ is —O—R$_6$— or —N(SO$_2$R$_3$)—R$_6$—;

L$_1$ is a divalent linking group as listed above for R$_6$;

L$_2$ is selected from the group consisting of a covalent bond; phenylene; C$_3$-C$_8$ cycloalkylene; —O—; —S—; —SO$_2$—; —CO—; —CO$_2$—; —OCO$_2$—; —O$_2$C—C$_1$-C$_{12}$ alkylene-CO$_2$—; —O$_2$C-arylene-CO$_2$ —; —O$_2$C—(C$_3$-C$_8$)cycloalkylene-CO$_2$—; —O$_2$CNH—C$_1$-C$_{12}$ alkylene-NHCO$_2$—; —O$_2$CNH-arylene-NHCO$_2$—; —CO$_2$—C$_1$-C$_{12}$ alkylene-O$_2$C—; —SO$_2$N(R$_2$)—; —N(R$_3$)—; —SO$_2$—C$_1$-C$_{12}$ alkylene-SO$_2$—; —SO$_2$-arylene-SO$_2$—; —SO$_2$N(R$_2$)—C$_1$-C$_{12}$ alkylene-N(R$_2$)SO$_2$—; —SO$_2$N(R$_2$)-arylene-N(R$_2$)SO$_2$—; —O—C$_1$-C$_{12}$ alkylene-O— and —O-arylene-O—;

L$_3$ is selected from the group consisting of a covalent bond, —O—, —CH$_2$- and —CH(CH$_3$)—; and n is an integer from 2 to about 50;

or wherein —B—L$_2$—B— in combination represents the formula:

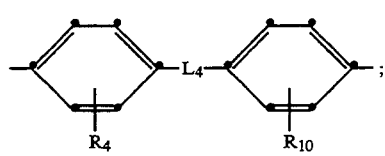

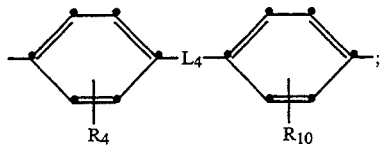

wherein

L$_4$ is selected from the group consisting of —N(R$_5$)—, —O—, —S—, —CH=CH— and

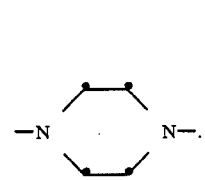

2. The light-absorbing thermoplastic polymer composition of claim 1 wherein the thermoplastic polymer is selected from the group consisting of polyesters, polyolefins, polyamides, polyimides, polyvinyl chloride, polyvinylidene chloride, polyurethanes, polycarbonates, cellulose esters, polyacrylates, polyvinylesters, polyester-amides, polystyrene, acrylonitrile-butadiene-styrene, and styrene-acrylonitrile.

3. The light-absorbing thermoplastic polymer composition of claim 2, wherein the thermoplastic polymer is a polyolefin.

4. The light-absorbing thermoplastic polymer composition of claim 3 wherein the polyolefin is polyethylene, polypropylene, or polybutylene.

5. The light-absorbing thermoplastic polymer composition of claim 1, wherein one of the thermoplastic polymers is a polyamide.

6. The light-absorbing thermoplastic polymer composition of claim 1, wherein one of the thermoplastic polymers is a polyurethane.

7. The light-absorbing thermoplastic polymer composition of claim 1, wherein one of the thermoplastic polymers is a polyvinyl chloride.

8. The light-absorbing thermoplastic polymer composition of claim 1, wherein one of the thermoplastic polymers is a polyvinylidene chloride.

9. The light-absorbing thermoplastic polymer composition of claim 1, wherein one of the thermoplastic polymers is a polycarbonate.

10. The light-absorbing thermoplastic polymer composition of claim 1, wherein one of the thermoplastic polymers is a polyester.

11. The light-absorbing thermoplastic polymer composition of claim 1, wherein one of the thermoplastic polymers is a cellulose ester.

12. The light-absorbing thermoplastic polymer composition of claim 1, wherein one of the thermoplastic polymers is a polyacrylate.

13. The light-absorbing thermoplastic polymer composition of claim 1, wherein one of the thermoplastic polymers is a polyester-amide.

14. The light-absorbing thermoplastic polymer composition of claim 1, wherein one of the thermoplastic polymers is a polystyrene.

15. The light-absorbing thermoplastic polymer composition of claim 1, wherein the thermoplastic polymer is a blend of a polyester and a polycarbonate.

16. A shaped or formed article comprised of the light-absorbing thermoplastic polymer composition of claim 1.

17. A shaped or formed article comprised of the light-absorbing thermoplastic polymer composition of claim 3.

18. A shaped or formed article comprised of the light-absorbing thermoplastic polymer composition of claim 4.

* * * * *